US011475474B2

(12) United States Patent
Scislowski et al.

(10) Patent No.: US 11,475,474 B2
(45) Date of Patent: Oct. 18, 2022

(54) MAINTENANCE OF VIRTUAL CREDIT CARD POOL FOR AIRLINE PASSENGER VOUCHERS

(71) Applicant: TA Connections IL, LLC, Schaumburg, IL (US)

(72) Inventors: Ted Scislowski, Inverness, IL (US); Brian Olson, Maple Grove, MN (US); David Velasquez, Scottsdale, AZ (US)

(73) Assignee: TA Connections IL, LLC, Schaumburg, IL (US)

( * ) Notice: Subject to any disclaimer, the term of this patent is extended or adjusted under 35 U.S.C. 154(b) by 0 days.

(21) Appl. No.: 17/452,836

(22) Filed: Oct. 29, 2021

(65) Prior Publication Data

US 2022/0051285 A1   Feb. 17, 2022

Related U.S. Application Data

(63) Continuation of application No. 16/882,700, filed on May 25, 2020, now Pat. No. 11,164,205.
(Continued)

(51) Int. Cl.
*G06Q 30/02* (2012.01)
*G06Q 20/06* (2012.01)
(Continued)

(52) U.S. Cl.
CPC ......... *G06Q 30/0235* (2013.01); *G06Q 20/06* (2013.01); *G06Q 20/351* (2013.01); *G06Q 20/387* (2013.01); *G06Q 30/0223* (2013.01)

(58) Field of Classification Search
CPC ........... G06Q 30/0235; G06Q 30/0223; G06Q 20/06; G06Q 20/387; G06Q 20/351; G06Q 20/227
See application file for complete search history.

(56) References Cited

U.S. PATENT DOCUMENTS 8,762,185 B2   6/2014   Shaw et al.
9,704,110 B2   7/2017   Shaw et al.
(Continued)

OTHER PUBLICATIONS

"The Virtual Credit Card (VCC) Revolution" (Dudarenok, Mike A.; published on Aug. 1, 2015 at https://www.linkedin.com/pulse/virtual-credit-card-vcc-revolution-mike-dudarenok) (Year: 2015).*
(Continued)

*Primary Examiner* — James M Detweiler
(74) *Attorney, Agent, or Firm* — Neal, Gerber & Eisenberg LLP

(57) ABSTRACT

Methods and apparatus are disclosed for the maintenance of a virtual credit card pool for airline passenger vouchers. An example system includes server(s) that are configured to determine a target distribution of virtual credit cards within the virtual card pool for a current date-and-time. The server(s) are configured to, in response to determining that the current date-and-time corresponds with a predefined restocking time, for each card value: identify a current number of virtual credit cards within the virtual card pool; identify a threshold number of virtual credit cards based on the target distribution; compare the current and threshold numbers; in response to determining that the current number is less than the threshold number, transmit a request for virtual credit cards having the card value to an external server; and add the requested virtual credit cards to the virtual card pool upon receipt.

15 Claims, 13 Drawing Sheets

Related U.S. Application Data

(60) Provisional application No. 62/852,787, filed on May 24, 2019.

(51) Int. Cl.
   *G06Q 20/38*      (2012.01)
   *G06Q 20/34*      (2012.01)

(56) References Cited

U.S. PATENT DOCUMENTS

| | | | |
|---|---|---|---|
| 10,528,895 | B2 | 1/2020 | Sedlarevic et al. |
| 2001/0051917 | A1 | 12/2001 | Bissonette et al. |
| 2005/0165902 | A1 | 7/2005 | Hellenthal et al. |
| 2008/0021893 | A1 | 1/2008 | Bakalash et al. |
| 2008/0228648 | A1 | 9/2008 | Kemper et al. |
| 2009/0287600 | A1 | 11/2009 | Amorosa et al. |
| 2010/0185505 | A1 | 7/2010 | Sprogoe et al. |
| 2010/0299733 | A1* | 11/2010 | Paschini ............. G06Q 10/087 726/6 |
| 2012/0185378 | A1 | 7/2012 | Liu |
| 2012/0259667 | A1 | 10/2012 | Pelissier et al. |
| 2014/0244374 | A1* | 8/2014 | Morris ............... G06Q 30/0233 705/14.37 |
| 2015/0206251 | A1 | 7/2015 | Yofe et al. |
| 2016/0063489 | A1* | 3/2016 | Sutton .................. G06Q 20/387 705/17 |
| 2018/0089598 | A1* | 3/2018 | Sedlarevic ............. G06Q 10/02 |
| 2019/0303803 | A1* | 10/2019 | Buc ........................ G06Q 20/36 |
| 2020/0005301 | A1* | 1/2020 | Shanmugam ........... G06Q 20/20 |

OTHER PUBLICATIONS

Sabre Virtual Payments—Traveler, [retrieved from internet on Mar. 21, 2022], https://web.archive.org/web/20160825213658/https://www.sabretravelnetwork.com/home/solutions/product/sabre_virtual_payments_traveler published on Aug. 25, 2016 according to the Wayback Machine, see sections What's in it for you and "How it works for you".

\* cited by examiner

FIG. 9

| | | | | | | | | | | | | |
|---|---|---|---|---|---|---|---|---|---|---|---|---|
| Status | Ticket Level | PAXs | Name | Record Locator | Child | SSR | Pet | Email | Phone | Meals | Offer | Offer Accept |
| None | Economy | 1 | Apple, Billy | 1001IMAYA37 | | | | ✉ | ☎ | 🍽 | 📄 | ⬜ |
| None | Economy | 1 | Carlson, Quentin | 1001IMAYA35 | | | | ✉ | ☎ | 🍽 | 📄 | ⬜ |
| Gold | First | 1 | Cary, Lisa | 1001IMAYA30 | | | | ✉ | ☎ | 🍽 | 📄 | ⬜ |
| None | Economy | 1 | Cary, Mary | 1001IMAYA28 | | | | ✉ | ☎ | 🍽 | 📄 | ⬜ |
| None | Economy | 1 | Cary, Tommy | 1001IMAYA29 | | | | ✉ | ☎ | 🍽 | 📄 | ⬜ |
| None | Economy | 1 | Davidson, Donald | 1001IMAYA14 | | | | ✉ | ☎ | 🍽 | 📄 | ⬜ |
| None | Economy | 1 | Davidson, Donald | 1001IMAYA39 | | | | ✉ | ☎ | 🍽 | 📄 | ⬜ |
| None | Economy | 1 | Davidson, Eric | 1001IMAYA15 | | | | ✉ | ☎ | 🍽 | 📄 | ⬜ |
| None | Economy | 1 | Davidson, Eric | 1001IMAYA40 | | | | ✉ | ☎ | 🍽 | 📄 | ⬜ |
| None | Economy | 1 | Davidson, Lisa | 1001IMAYA38 | | | | ✉ | ☎ | 🍽 | 📄 | ⬜ |
| None | Economy | 1 | Davidson, Lisa | 1001IMAYA13 | | | | ✉ | ☎ | 🍽 | 📄 | ⬜ |
| None | Economy | 1 | Ericson, Evan | 1001IMAYA16 | | | | ✉ | ☎ | | 📄 | ⬜ |
| None | First | 1 | Fredricks, Harry | 1001IMAYA34 | | | | ✉ | | | 📄 | ⬜ |
| None | First | 1 | Garrett, Johnny | 1001IMAYA24 | | | | ✉ | | | 📄 | ⬜ |
| None | Economy | 1 | Garrett, Lief | 1001IMAYA23 | | | | ✉ | | | 📄 | ⬜ |
| None | Economy | 1 | Jacobs, Elias | 1001IMAYA22 | | | | ✉ | | | 📄 | ⬜ |
| Gold | Economy | 1 | Johnson, Larry | 1001IMAYA26 | | | | ✉ | | | 📄 | ⬜ |

PNRs: 28  Pax: 28  SSR: 0  Pets: 0  Minors: 0  No Contact Info: 0

1200

ABC

You're confirmed!
Here's your hotel information and meal vouchers.

1210

| Check-in code: | EYW5C ⓘ |
|---|---|

| 3 miles | PREMIUM |
|---|---|

Renaissance Chicago O'Hare Suites
8500 W. Bryn Mawr Ave, Chicago, IL
773-380-9600

| Shuttle 24/7: | 773-380-9600 |
|---|---|
| Check in: | Monday, May 11, 2020 |
| Check out: | Tuesday, May 12, 2020 |
| Number of rooms: | 1 |

Meal vouchers
- Good for food and non-alcoholic drinks
- One-time use          1220

| Meal voucher | 1 of 1 |
|---|---|

[QR code]

| Amount | Redeem by (single use) |
|---|---|
| $10.00 | May 12, 2020 |

| MASTERCARD | CVC |
| 5100-0000-0009-8622 | 1234 |
| Expiration | Billing zip code |
| 05/2023 | 60173 |

TWA | ⌂ Home | 🗉 Supplier details | 👤 Guest Arrival ▼

Home / Guest Arrival / Guest Check-in

1300

1310 — Passenger Check-in ⓘ

[please enter code] [👤 Check-in]

Activity [Yesterday] [Today] [Tomorrow]

| Voucher | Date | Airline | Flight | Rooms | Passengers | Nights | Charge | Status |
|---|---|---|---|---|---|---|---|---|
| 3511752 | 5/11/2020 | Purple Rain Airlines | 100 | 1 | 1 | 1 | $117.40 | 🔒 |
| 3511753 | 5/11/2020 | Purple Rain Airlines | 100 | 1 | 1 | 1 | $117.40 | 🔒 |
| 3511754 | 5/11/2020 | Purple Rain Airlines | 100 | 1 | 1 | 1 | $117.40 | 🔒 |
| 3511755 | 5/11/2020 | Purple Rain Airlines | 100 | 1 | 1 | 1 | $117.40 | 🔒 |

💬 Chat

MAINTENANCE OF VIRTUAL CREDIT CARD POOL FOR AIRLINE PASSENGER VOUCHERS

CROSS-REFERENCE TO RELATED APPLICATION

This application is a continuation of U.S. patent application Ser. No. 16/882,700, filed on May 25, 2020, which claims the benefit of U.S. Provisional Application No. 62/852,787, filed on May 24, 2019. These applications are incorporated by reference herein in their entirety.

TECHNICAL FIELD

This disclosure generally relates to virtual credit cards and, more specifically, to the maintenance of a virtual credit card pool for airline passenger vouchers.

BACKGROUND

Sometimes flights between airports are delayed and/or canceled (e.g., due to inclement weather, mechanical problems, etc.). Such delays and/or cancelations may potentially prevent one or more passengers from reaching their final destination on time (e.g., due to missing a connecting flight). As a result, one or more passengers of a flight may be unable to travel or be temporarily stuck at a corresponding city overnight and/or other short period of time.

An airline with a delayed and/or cancelled flight may provide a voucher for meal(s) and/or a hotel room to a passenger. For instance, an airline may provide a hotel voucher to a person who has been rescheduled for a flight on a subsequent day. Oftentimes, an airline utilizes a third party to book a hotel room on behalf of the disrupted passenger. Typically, the third party provides the disrupted passenger with a paper voucher that is to be used when checking into the booked hotel room. For instance, a representative of an airline may receive a request from a disrupted passenger for overnight accommodations, the airline representative contacts the third party to book a hotel room for the passenger, and the airline representative then issues a paper voucher to the passenger. Subsequently, the passenger goes to a corresponding hotel and provides the paper voucher to the hotel, the hotel later provides a copy of the paper voucher to the third party that booked the room, and the third party provides the voucher copy to the airline for billing purposes. The use of paper vouchers oftentimes is inefficient in terms of scheduling rooms for disrupted passengers and/or billing between a hotel, a third party, and the airline. Additionally, the reliance on paper vouchers may potentially increase the likelihood of fraudulent behavior.

Recently, some companies have begun issuing virtual credit cards in place of paper vouchers. For instance, upon identifying a delayed passenger, an airline representative contacts a third party to book a hotel room for the delayed passenger. The third party issues a virtual credit card to the delayed passenger as a hotel voucher. Afterwards, the passenger goes to a corresponding hotel and provides the virtual credit card to the hotel, and the hotel processes the virtual credit card as a voucher.

Companies that issue and process virtual credit cards may include (i) credit card companies and (ii) third-party companies that interact with credit card companies to manage the value of virtual credit cards. In some instances, companies that issue and process virtual credit cards are limited by the computing systems of credit card companies. Typically, credit card companies are required to continuously process large amounts of data related to credit card transactions. To increase the amount of data able to be processed, computing systems of credit card companies have been designed to batch processing tasks together. For instance, computing systems of credit card companies may be designed to designate one time of day for reconciling charges to credit cards, another time of day for reporting charges to outside parties, and yet another time of day for issuing new (virtual) credit cards and/or adjusting limits of previously-issued (virtual) credit cards. Additionally, because the computing systems of credit card companies are continuously processing large amounts of data, credit card companies may be unable to sufficiently update their computing systems and, thus, may be operating with antiquated computing systems.

As a result of credit card companies antiquated computing systems and corresponding reliance on batching processing, virtual credit card companies occasionally are unable to issue virtual credit cards in real-time. For instance, a traveler may obtain delayed status when a computing system of a designated credit company is not issuing new cards or adjusting limits on existing cards. In turn, the company issuing a virtual credit card as a hotel voucher to a delayed traveler may potentially be unable to issue the virtual credit card in a timely manner, thereby preventing the delayed traveler from checking into a hotel for the night.

SUMMARY

The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example disclosed system for operating a pool of virtual credit cards for airline passenger vouchers includes one or more databases configured to store virtual credit cards within a virtual card pool and one or more servers. The one or more servers are configured to unlock one of the virtual credit cards stored within the virtual card pool for each accepted voucher offer of a qualifying passenger name record, remove each unlocked virtual credit card stored from virtual card pool, identify a current date-and-time, and determine a target distribution of virtual credit cards within the virtual card pool for the current date-and-time. The target distribution indicates a target quantity of cards for each of a plurality of card values. The one or more servers also are configured to determine whether the current date-and-time corresponds with a predefined restocking time to restock the virtual card pool based on the target distribution. The one or more servers also are configured to, in response to determining that the current date-and-time corresponds with the predefined restocking time, for each of the plurality of card values: identify a current number of virtual credit cards within the virtual card pool that have the card value; identify a threshold number of virtual credit cards for the card value based on the target distribution; compare the current number of virtual credit cards to the threshold number of virtual credit cards; in response to determining that the current number of virtual credit cards is less than the threshold number of virtual credit cards, transmit a request for a set of virtual credit cards having the card value to an external server of a card distributer; and add the requested virtual credit cards having the card value to the virtual card pool upon receipt from the external server.

In some examples, the target distribution at a first date-and-time is different than the target distribution at a second date-and-time. In some such examples, the one or more databases are configured to store the target quantity for each of the plurality of card values of the target distribution for each respective date-and-time.

In some examples, for each accepted offer, the one or more servers are configured to determine whether the virtual card pool includes a virtual credit card having a card value that equals a voucher value of the accepted offer and, in response to determining that the virtual card pool includes a virtual credit card having the voucher value, unlock a virtual credit card having the voucher value for the qualified passenger name record. For each accepted offer, the one or more servers also are configured to, in response to determining that the virtual card pool does not include a virtual credit card having the voucher value, unlock a virtual credit card having a next-greater value relative to the voucher value and transmit a request to the external server of the card distributer for the value of the credit card to be adjusted to the voucher value. The request is repeatedly transmitted until the external server adjusts the value or the voucher duration ends.

In some examples, the one or more servers are configured to receive a list of qualified passenger name records of a delayed flight that qualify for a voucher, identify contact information for each of the qualified passenger name records, and transmit a voucher offer based on the contact information for each of the qualified passenger name records. In some such examples, when the accepted voucher offer is for a hotel voucher, the one or more servers are configured to identify a voucher value and a voucher duration for the accepted voucher and determine whether a hotel pool stored in the one or more databases includes one or more hotel vacancies that corresponds with the voucher value and the voucher duration. The one or more servers also are configured to, in response to determining that the hotel pool stored in the one or more databases includes one or more hotel vacancies that corresponds with the voucher value and the voucher duration, present the one or more hotel vacancies to a passenger corresponding to the passenger name record via the contact information. The one or more servers also are configured to, in response to determining that the hotel pool stored in the one or more databases does not include one or more hotel vacancies that corresponds with the voucher value and the voucher duration, search for one or more hotel vacancies and present the one or more hotel vacancies to the passenger. The one or more servers also are configured to, in response to receiving a hotel selection from the passenger, unlock one of the virtual credit cards stored within the virtual card pool and distribute the unlocked virtual credit card for the passenger, transmit a check-in code to the passenger via the contact information, and transmit an arrival notification to a hotel of the hotel selection. Further, in some such examples, the one or more servers are configured to reconcile the processed hotel voucher with a corresponding charge to the virtual credit card. Moreover, in some such examples, for each of one or more airlines, the one or more servers are configured to generate and transmit a report at a predefined date-and-time. The report includes each reconciled transaction of each virtual credit card unlocked for one or more qualified passengers of the airline.

An example disclosed method for operating a pool of virtual credit cards for airline passenger vouchers includes storing, via one or more databases, virtual credit cards within a virtual card pool and, in response to a voucher offer for a qualifying passenger name record being accepted, unlocking one of the virtual credit cards stored within the virtual card pool and removing the unlocked virtual credit card stored from virtual card pool. The example disclosed method also includes determining, via the one or more servers, a target distribution of virtual credit cards within the virtual card pool for a current date-and-time. The target distribution indicates a target quantity of cards for each of a plurality of card values. The example disclosed method also includes determining, via the one or more servers, whether the current date-and-time corresponds with a predefined restocking time to restock the virtual card pool based on the target distribution. The example disclosed method also includes. in response to determining that the current date-and-time corresponds with the predefined restocking time, for each of the plurality of card values: identifying, via the one or more servers, a current number of virtual credit cards within the virtual card pool that have the card value; identifying, via the one or more servers, a threshold number of virtual credit cards for the card value based on the target distribution; comparing, via the one or more servers, the current number of virtual credit cards to the threshold number of virtual credit cards; in response to determining that the current number of virtual credit cards is less than the threshold number of virtual credit cards, transmitting, via the one or more servers, a request for a set of virtual credit cards having the card value to an external server of a card distributer; and adding, via the one or more servers and the one or more databases, the requested virtual credit cards having the card value to the virtual card pool upon receipt from the external server.

In some examples, the target distribution at a first date-and-time is different than the target distribution at a second date-and-time. In some such examples, the target distribution at a first date-and-time has a target quantity of cards for a card value within the virtual pool that is different than the target quantity of cards for the card value at a second date-and-time. In some examples, determining the target distribution includes identifying a first target quantity of cards for a first card value within the virtual pool and identifying a second target quantity of cards for a second card value within the virtual pool. The second card value is different than the first card value, and the first target quantity of cards is different than the second target quantity of cards.

In some examples, transmitting the request for the set of virtual credit cards includes requesting a predefined quantity of virtual credit cards having the card value. In some examples, transmitting the request for the set of virtual credit cards includes requesting a quantity of cards that equals a difference between the current number of credit cards having the card value and a target number of credit cards having the card value. Some examples further includes identifying a regularly-occurring period of time during which the external server of the card distributer consistently issues virtual credit cards and selecting the predefined restocking time to occur within the identified period of time.

Some examples further include unlocking a virtual credit card having a voucher value for the qualified passenger name record in response to determining that the virtual card pool includes the virtual credit card having the voucher value. Some such examples further include unlocking a virtual credit card having a next-greater value relative to the voucher value in response to determining that the virtual card pool does not include the virtual credit card having the voucher value. Further, some such example further include intermittently transmitting a request to the external server of the card distributer for the value of the credit card to be adjusted to the voucher value until the external server adjusts the value or the voucher duration ends.

An example disclosed computer readable medium comprising instructions, which, when executed, cause a combination of one or more machines to store virtual credit cards within a virtual card pool and, in response to a voucher offer for a qualifying passenger name record being accepted, unlock one of the virtual credit cards stored within the virtual card pool and remove the unlocked virtual credit card stored from virtual card pool. The instructions, which, when executed, also cause the combination of one or more machines to determine a target distribution of virtual credit cards within the virtual card pool for a current date-and-time. The target distribution indicates a target quantity of cards for each of a plurality of card values. The instructions, which, when executed, also cause the combination of one or more machines to determine whether the current date-and-time corresponds with a predefined restocking time to restock the virtual card pool based on the target distribution. The instructions, which, when executed, also cause the combination of one or more machines to, in response to determining that the current date-and-time corresponds with the predefined restocking time, for each of the plurality of card values: identify a current number of virtual credit cards within the virtual card pool that have the card value; identify a threshold number of virtual credit cards for the card value based on the target distribution; compare the current number of virtual credit cards to the threshold number of virtual credit cards; in response to determining that the current number of virtual credit cards is less than the threshold number of virtual credit cards, transmit a request for a set of virtual credit cards having the card value to an external server of a card distributer; and add the requested virtual credit cards having the card value to the virtual card pool upon receipt from the external server.

In some examples, when executed, the instructions cause, for each accepted offer, the combination of one or more machines to determine whether the virtual card pool includes a virtual credit card having a card value that equals a voucher value of the accepted offer and, in response to determining that the virtual card pool includes a virtual credit card having the voucher value, unlock a virtual credit card having the voucher value for the qualified passenger name record. when executed, the instructions cause, for each accepted offer, the combination of one or more machines to, in response to determining that the virtual card pool does not include a virtual credit card having the voucher value, unlock a virtual credit card having a next-greater value relative to the voucher value and transmit a request to the external server of the card distributer for the value of the credit card to be adjusted to the voucher value. The request is repeatedly transmitted until the external server adjusts the value or the voucher duration ends.

BRIEF DESCRIPTION OF THE DRAWINGS

For a better understanding of the invention, reference may be made to embodiments shown in the following drawings. The components in the drawings are not necessarily to scale and related elements may be omitted. In addition, system components can be variously arranged, as known in the art.

FIG. 9 depicts an example interface of the system of FIG. 2 for an airline agent within the environment of FIG. 1.

FIG. 12 depicts another example interface of the system of FIG. 2 for an airline passenger within the environment of FIG. 1.

FIG. 13 depicts an example interface of the system of FIG. 2 for a hotel receptionist within the environment of FIG. 1.

DETAILED DESCRIPTION OF EXAMPLE EMBODIMENTS

Figure 1:
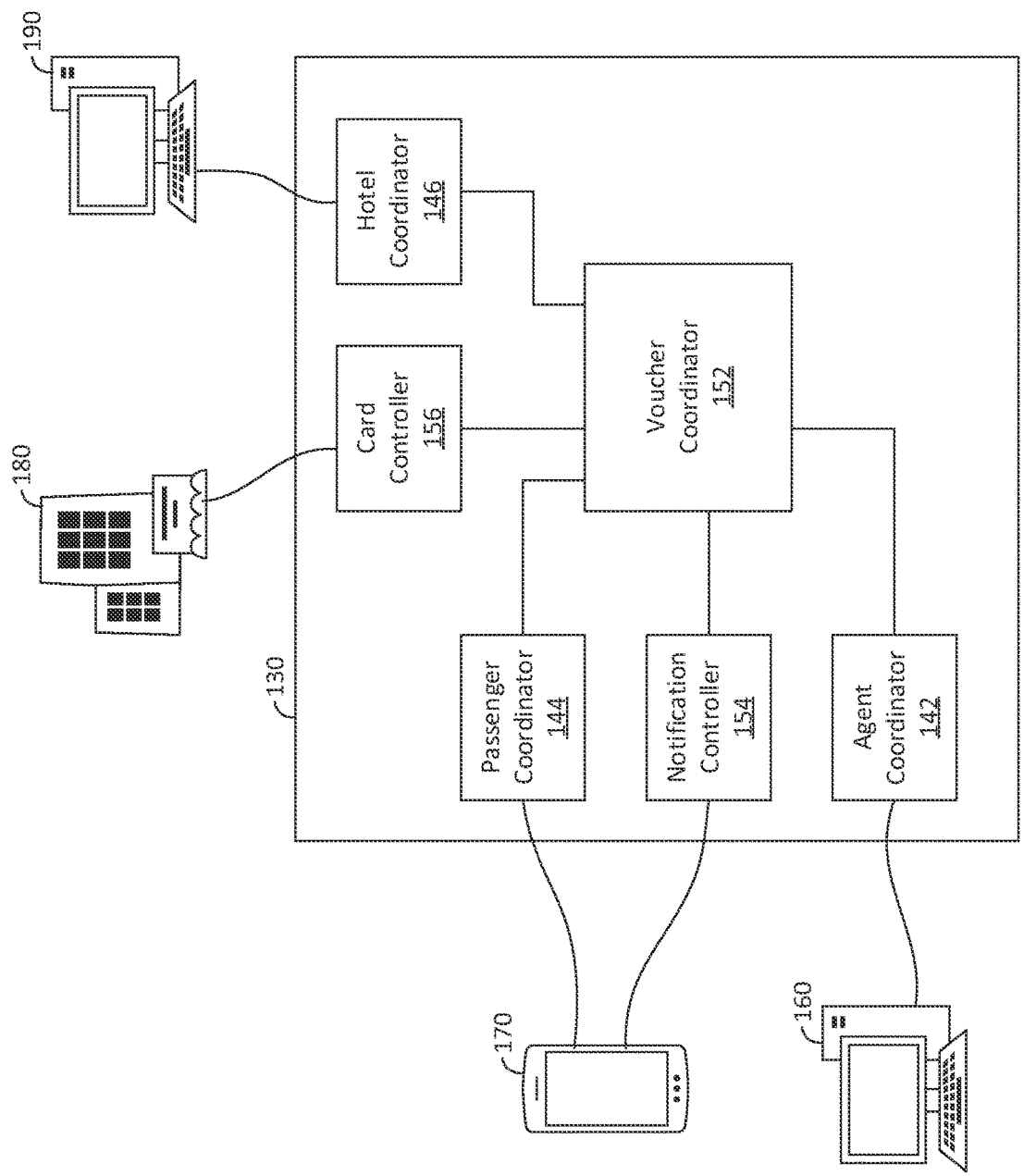
FIG. 1 depicts an example environment in which virtual credit cards are issued to airline passenger vouchers.

The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Example systems and methods disclosed herein detect when a flight is delayed, identify passenger name record(s) of passenger(s) on the flight that qualify for a voucher, notify the qualifying passenger(s) of the voucher, provide those passenger(s) with virtual credit card(s) immediately upon acceptance of the voucher(s), subsequently reconcile any transaction(s) charged to the virtual credit card(s) with the corresponding voucher(s), and batch the reconciled transaction(s) for processing by the corresponding airline. To enable the vouchers to be immediately issued to interested qualifying passengers, examples disclosed herein operate a pool of issued virtual credit cards that are unlocked and distributed as vouchers in real-time as requested by delayed travelers. Thus, the examples disclosed herein include a specific set of rules that provide an unconventional technological solution of operating a pool of virtual credit cards in a manner that enables the reliable distribution of the virtual credit cards in real-time to address the technological problem of processing limitations of scheduled batch processing of credit-card computing systems that result in untimely delays in the issuance virtual credit cards.

As used herein, a "virtual credit card" and a "VCC" refer to a randomly-generated card number that is associated with a credit card account and is different than the credit card number of the credit card account. Oftentimes, a virtual credit card is a randomly-generated, single-use number that limits the virtual credit card to a single transaction through utilization of a limited-use token. Other limits may be placed on a virtual credit card, such as activation duration, credit limits, service or product type limits, etc.

As used herein, "real-time" refers to a time period that is simultaneous to and/or immediately after a passenger is identified as qualifying for a voucher (e.g., a hotel voucher, a meal voucher, etc.). For example, real-time includes a duration of time that it takes for a passenger to disembark a plane and reach a nearby hotel and/or food court.

As used herein, a "voucher" refers to a bond that is worth a predetermined amount of money and is limited to be redeemed for predefined service(s) and/or good(s). Example vouchers include hotel vouchers, which are designated for hotel fares, and meal vouchers, which are designated for meal fares. Example vouchers include paper vouchers and digital or electronic vouchers.

As used herein, a "passenger name record" and "PNR" refer to a record (e.g., an alphanumeric code) for a respective passenger or group of passengers travelling together. For example, a family that books a flight together as a group is issued a single passenger name record that corresponds to each of the family members. Oftentimes, a passenger name record is generated by a travel organization (e.g., a travel agency, a travel website, a transportation provider) at the time travel accommodations are reserved for a corresponding traveler. In some example, the passenger name record includes the name of the passenger who booked and/or paid for the travel accommodations.

As used herein, a "qualified passenger name record" and "qualified PNR" refer to a passenger name record of one or more passenger(s) identified by an airline and/or other travel organization as qualifying for a voucher. For example, a passenger name record may qualify for a voucher if scheduled transportation for the passenger has been delayed and/or the passenger is a participant in a rewards program (also referred to as a loyalty program, a travel rewards program, etc.).

Additionally, example methods and systems disclosed herein utilize web applications, virtual credit cards, and digital check-in codes to quickly and efficiently (1) issue digital hotel vouchers for eligible and interested passengers and (2) securely process the digital vouchers for billing purposes. For example, a third party, such as an airline company, utilizes an example method and system disclosed herein to quickly and securely interact with airlines, passengers, and hotels to accommodate stranded passengers. The system includes one or more one or more processors and/or servers that are configured to execute software that enables the digital vouchers to be issued, processed, and billed. In such examples, the processor(s) and/or server(s) execute a virtual credit card (VCC) pool service, a passenger-facing web portal (e.g., a website), a hotel-facing web portal (e.g., a website), a notification service, and/or a voucher coordination service to facilitate the quick and secure processing of digital hotel vouchers. In the illustrated example, the VCC pool service, the notification service, and the voucher coordination service API are application programming interfaces (APIs).

In operation of such examples, when a flight is canceled or delayed, an airline utilizes an agent application to determine if a passenger is eligible for a hotel voucher. The voucher coordination service collects that information from the agent app (e.g., via a web service, such as a RESTful web service). In some such examples, the collected information includes contact information (e.g., an email address, a phone number, etc.) for contacting the passenger. Additionally or alternatively, the voucher coordination service has and/or collects the passenger contact information via other means.

Upon identifying a passenger that is eligible for a voucher, the voucher coordination service causes the notification service to contact the eligible passenger in order to offer a voucher. For example, the notification service texts the voucher offer to the phone number of the passenger (e.g., via a Twilio® service). Additionally or alternatively, the notification service emails the voucher offer to the email address of the passenger (e.g., via an email service, such as Amazon® SES). The offer includes a unique, time-sensitive web link. For example, the web link is configured to disable after a predefined period of time (e.g., 24 hours). In some examples, the predefined period of time at which the web link disables is selectable by the airline agent via the agent-facing application.

Further, when the passenger opens the unique web link, the voucher coordination service identifies hotel inventory in the city where the passenger is disrupted. Additionally, the voucher coordination service directs the passenger to the passenger-facing web portal operating on any internet-enabled device (e.g., a smartphone) of the passenger. The web portal (e.g., a web application) enables the passenger to select a hotel for the voucher. Upon receiving the selection from the passenger, the web portal communicates the selection to the voucher coordination service (e.g., via a web service, such as a RESTful web service).

Subsequently, the voucher coordination service generates a virtual credit card from the VCC pool service and sets the virtual credit card to an amount that corresponds with the rate for the hotel selected by the passenger. For example, the amount on the virtual credit card matches a rate of the hotel reservation plus any corresponding taxes. In some instances, the voucher coordination service may be unable to set the predetermined amount on the virtual credit card. If the voucher coordination service is unable to set the amount on the virtual credit card, the occurrence may be logged and the virtual credit card may remain unlocked for use at an amount that covers the total cost of the booking plus a buffer.

Upon setting the amount on the virtual credit card, the voucher coordination service generates a check-in code that is designated directly to the passenger and the specific virtual credit card. For example, the check-in code may be a QR code and/or an alphanumeric code (e.g., a 5-character alphanumeric code). Subsequently, the voucher coordination service causes the passenger-facing web portal to communicate the check-in code via a confirmation screen on a display of the mobile device of the passenger. Additionally or alternatively, the voucher coordination service may cause the notification service to communicate confirmation information to the passenger via text and/or email. The confirmation information includes a unique offer link that causes the passenger-facing web portal to display the check-in code to the passenger.

Upon arriving at the hotel, the passenger shows the check-in code, via the display of his or her mobile device, to a representative of the hotel. Further, the hotel representative utilizes a hotel-facing web portal to validate the passenger is connected to the voucher for use at the specific hotel. For example, the hotel-facing web portal collects the check-in code from the hotel representative. The hotel representative enters the check-in code upon viewing it via the mobile device, text or email of the passenger. The voucher coordination service receives the check-in code from the hotel-facing web portal for validation. Upon validating the check-in code, the voucher coordination service "unlocks" the virtual credit card for use and causes the hotel-facing web portal to present check-in information to the hotel representative. The check-in information includes a number of the virtual credit card, a corresponding expiry date, and a corresponding security code (e.g., a card verification code or CVC). In some such examples, the virtual credit card is unlocked and its information is accessible to the hotel for a limited period of time (e.g., 7 days) that enables the hotel to complete the billing process with the third-party. Additionally, the voucher coordination service unlocking the virtual credit card indicates to the third party and/or the airline that the passenger has actually utilized the voucher to stay at the hotel overnight. In some such examples, completion of each step of the voucher process causes a message of the offer state to be sent to the airline to enable the airline to have real-time situational awareness of the voucher sequence.

Additionally, after the hotel posts a transaction to the virtual credit card for the voucher, the transaction is communicated to the voucher coordination service within a short period of time (e.g., 48 hours) via an XML batch file via a SSH File Transfer Protocol (SFTP). The voucher coordination service utilizes the batch file for the quick and paperless auto-reconciliation of hotel fees with the airline by comparing the amount charged by the virtual credit card to the authorized booking amount in an automated manner.

Turning to the figures, FIG. 1 depicts an example environment in which one or more servers 130 are configured to distribute, in real-time and at any time throughout the day, virtual credit cards as vouchers for delayed airline passengers. As illustrated in FIG. 1, the server(s) 130 are configured to communicate, via wired and/or wireless communication, with an agent computer 160 operating an agent-facing application for an airline agent, a mobile device 170 of a passenger, a credit system 180 of a virtual credit card (VCC) provider, and a hotel computer 190 operated by a hotel receptionist.

In the illustrated example, the server(s) 130 include an agent coordinator 142, a passenger coordinator 144, a hotel coordinator 146, a voucher coordinator 152, a notification controller 154, and a card controller 156.

The voucher coordinator 152 is in communication with each of the agent coordinator 142, the passenger coordinator 144, the hotel coordinator 146, the notification controller 154, and the card controller 156 to coordinate distribution of vouchers for delayed passengers. The voucher coordinator 152 includes an application program, such as a voucher application programming interface (API) to coordinate distribution of vouchers.

Additionally, the agent coordinator 142 is in communication with the agent-facing application operating on the agent computer 160. For example, the agent coordinator 142 includes an agent-facing web application that is configured to present interface(s), such the an interface 900 of FIG. 9, via the agent computer 160 to enable agent(s) of the airline to select and/or monitor voucher(s) for delayed passengers.

The notification controller 154 includes an application program, such as an application programming interface (API), that also communicates with the mobile device 170 of the passenger. For example, the notification controller 154 includes a notification API configured to present notification message(s), such as the interface 1000 of FIG. 10, to notify selected delayed passenger(s) passengers that they have qualified for a meal, hotel, and/or other voucher.

The passenger coordinator 144 includes an application program, such as a web application (e.g., an HTTPS web application), that communicates with the mobile device 170 of the passenger. For example, the passenger coordinator 144 includes a passenger-facing web application that is configured to present interface(s), such as the interface 1100 of FIG. 11 and/or the interface 1200 of FIG. 12, via the mobile device 170 to enable delayed passenger(s) to reserve hotel room(s) and/or to present related code(s) for use (e.g., virtual credit card code(s), check-in code(s), etc.).

The card controller 156 includes an application program, such as an API, that communicates with the credit system 180 of the VCC provider. For example, the card controller 156 includes a VCC API that is configured to transmit request(s) to the credit system 180 of the VCC provider for additional virtual credit card(s) and/or for value adjustment(s) of previously-received virtual credit card(s).

The hotel coordinator 146 includes an application program, such as a web application (e.g., an HTTPS web application), that communicates with the hotel computer 190 operated by the hotel receptionist. For example, the hotel coordinator 146 includes a hotel-facing web application that is configured to present interface(s), such as the interface 1300 of FIG. 13, via the hotel computer 190 to enable hotel receptionist(s) and/or other hotel employee(s) in processing hotel reservation(s) associated with respective hotel voucher(s).

The agent coordinator 142, the passenger coordinator 144, the hotel coordinator 146, the voucher coordinator 152, the notification controller 154, and the card controller 156 of the server(s) 130 are configured to operate and maintain a pool of VCCs in a manner that overcomes the batch processing limitations of credit-card computing systems to enable the reliable and real-time distribution of VCCs as vouchers.

For example, when a flight is canceled or delayed, an airline agent utilizes an agent-facing application (e.g., an agent-facing web application) to select passengers that qualify for a hotel and/or other voucher. For example, the airline agent selects the qualifying passengers utilizing an interactive interface 900 of FIG. 9 of the agent-facing application presented via the agent computer 160.

In FIG. 9, a left-hand portion of the interface 900 enables the airline agent to select a flight for examination and/or processing. A top portion of the interface 900 identifies a selected flight. Additionally, the interface 900 includes a grid of passenger information for the selected flight. The passenger information may imported and/or manually entered into a corresponding system for presentation via the interface 900. For example, each row corresponds with a respective passenger of the selected flight, and each column relates to different information associated with the passengers. In the illustrated example, the columns correspond with a preferred-customer (e.g., frequent-flier) status, a ticket or seat level, a number of passengers associated with the ticket, a passenger name and/or passenger name record, a record ID, and other qualifying information (e.g., a child status, a SSR status, a pet status, etc.). Further, the grid of passenger information includes contact information columns. For example, one column identifies whether an email address of the passenger is known, and another column indicates whether a phone number of the passenger is known. Additionally, the grid of passenger information includes status update columns related to corresponding vouchers. In the illustrated example, one column identifies which passengers qualify for a meal voucher. Another column identifies in real-time whether a meal voucher has been offered to corresponding passengers. Further, another column identifies in real-time whether a meal voucher has been accepted by a corresponding passenger. Additionally or alternatively, the interface 900 includes columns that identifies which passengers qualify for a hotel voucher, another column that identifies in real-time whether a hotel voucher has been offered, and another column that identifies in real-time whether a hotel voucher has been accepted.

The interface 900 of the agent-facing application enables the airline agent to select passengers for vouchers and monitor the subsequent use of the vouchers. For example, the interface 900 enables the airline agent to manually select which passengers qualify for a voucher. In other examples, the passengers are automatically selected (e.g., by the agent coordinator 142) based on characteristics of the passenger (e.g., the customer status, the initial point of departure, the final destination of the customer, etc.) and/or the flight (e.g., the duration of delay, the delayed time of arrival, etc.). In some examples, the agent coordinator 142 controls operation of the agent-facing application. In such examples, the agent coordinator 142 identifies the passengers for a voucher as the agent selects the passengers via the interface 900. In other examples, the agent-facing application is operated by a third party, and the agent coordinator 142 is in communication with the agent-facing application to receive a list of passengers who qualified for a voucher. Further, in such examples, the agent coordinator 142 also receives the contact information of the qualified passengers via the agent-facing application.

Subsequently, the voucher coordinator 152 receives the list of qualified passengers from the agent coordinator 142. The voucher coordinator 152 coordinates with the notification controller 154 to notify qualified passengers of the corresponding voucher offers. The voucher coordinator 152 and/or the notification controller 154 selects a means of communication based on the corresponding contact information. For example, the voucher coordinator 152 is configured to send a notification message via text message (e.g., utilizing a text service, such as Twilio®) if the contact information includes a phone number and/or email the notification message (e.g., utilizing an email service, such as Amazon® SES) if the contact information includes an email address. The voucher coordinator 152 may cancel an offer as long as the voucher has yet to be declined or accepted by the delayed passenger.

Figure 10:
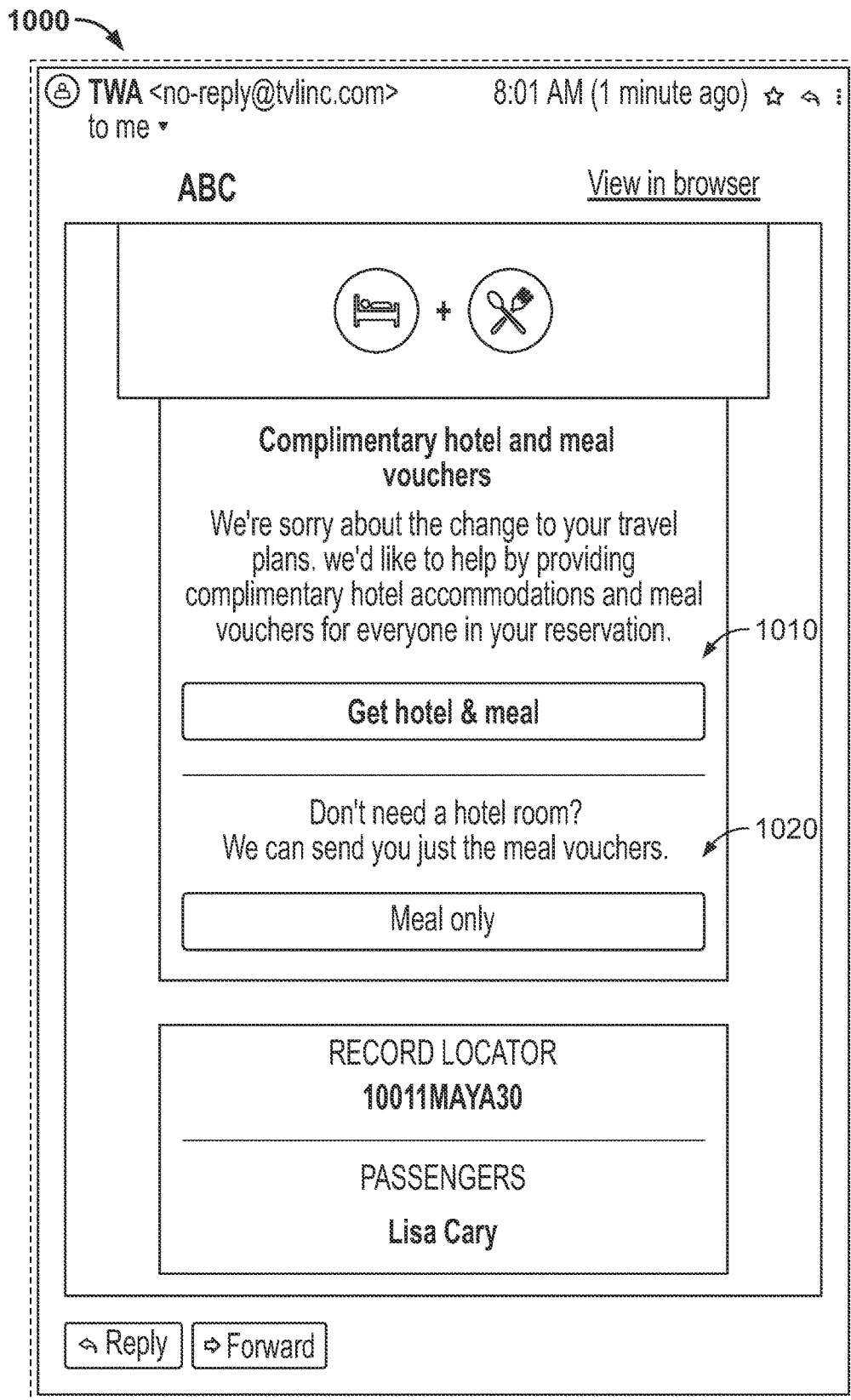
FIG. 10 depicts an example interface of the system of FIG. 2 for an airline passenger within the environment of FIG. 1.

FIG. 10 depicts an example interface 1000 that includes the notification message in the form of an email. In the illustrated example, the notification message informs the delayed passenger of hotel and meal voucher offers. The notification message includes a unique, time-sensitive web link (e.g., the web link is disabled after 24 hours) for each of the hotel voucher offer and the meal voucher offer. For example, the email includes a hotel voucher button 1010 and a meal voucher button 1020. When the passenger accepts an offer, the agent coordinator 142 causes the agent-facing application to update the corresponding status on the interface 900.

Additionally, when the passenger selects the hotel voucher button 1010, the voucher coordinator 152 identifies, in real-time, hotel inventory in the nearby area. For example, the voucher coordinator 152 accesses (via one or more databases 135 of FIG. 2) a curated internal pool of available hotel accommodations that correspond with the hotel voucher for which the passenger qualifies. For example, the voucher coordinator 152 identifies available nearby rooms that (1) are available for the corresponding overnight stay and (2) costs less than or equal to the voucher amount for which the passenger qualifies. In some examples, a passenger with a particular status may qualify for and be offered a voucher for a more expensive hotel room. In some instances, the internal hotel pool may not include available hotel accommodations that correspond with the hotel voucher of the qualified passenger. In such instances, the voucher coordinator 152 is configured to search (e.g., scrape) third-party travel websites for available hotel accommodations that correspond with the hotel voucher of the qualified passenger.

Figure 11:
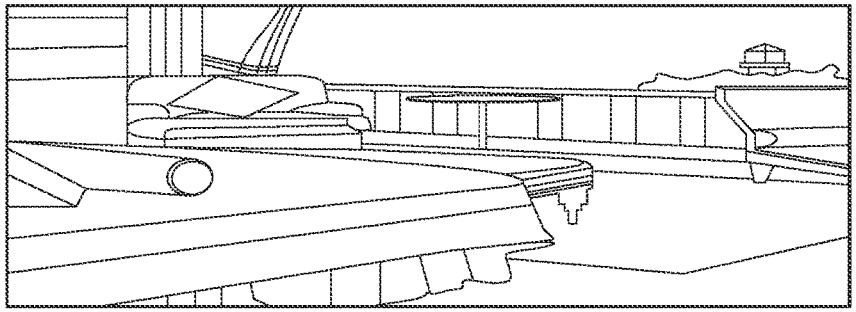
FIG. 11 depicts another example interface of the system of FIG. 2 for an airline passenger within the environment of FIG. 1.

Subsequently, the passenger coordinator 144 presents an interface 1100 of a passenger-facing application via the mobile device 170. As illustrated in FIG. 11, the interface 1100 enables the passenger to select a hotel room for the hotel voucher. Upon receipt of the selection via the passenger coordinator 144, the voucher coordinator 152 selects a virtual credit card (VCC) that is stored within an internal pool of VCCs (via the one or more databases 135 of FIG. 2) for hotel voucher of the delayed passenger. The voucher coordinator 152 maintains and operates the VCC pool to enable the reliable and real-time distribution of VCCs as vouchers. For example, the VCC pool includes a large quantity of VCCs at various limit values that were previously issued by the credit system 180 of a virtual credit card company. Typically, the credit system 180 uses scheduled batch processing to process different types of data at different times. As such, there are times when a VCC is desired for a hotel voucher and the credit system 180 is not processing new VCCs. To ensure that VCCs are available as hotel vouchers for delayed passengers at any time of day, regardless of whether the credit system is processing new VCCs, the card controller 156 manages the VCC pool to include a large number of VCCs at different limit values throughout the day.

When the passenger selects a hotel accommodation, the voucher coordinator 152 sends a request to the card controller 156 to select a VCC from the VCC pool based on the cost of the hotel accommodation. When the VCC pool includes a VCC that equals the voucher value associated with the selected hotel accommodation, the card controller 156 assigns that VCC as the hotel voucher for the delayed passenger. When the VCC pool does not include a VCC that equals the voucher value associated with the selected hotel accommodation, the card controller 156 assigns a VCC with the next-highest value relative to the voucher value as the hotel voucher for the delayed passenger. Further, the card controller 156 transmits a request to the credit system to adjust the value of the VCC. If the value of the VCC is not adjusted by the credit system 180, the VCC remains at the unadjusted value.

Additionally, when the passenger selects the hotel voucher button 1010, the voucher coordinator 152 sends a request to the card controller 156 to select a VCC from the VCC pool based on the voucher value for which the delayed passenger qualifies. When the VCC pool includes a VCC that equals the voucher value associated with the selected hotel accommodation, the card controller 156 unlocks the corresponding VCC and assigns the unlocked VCC as the meal voucher for the delayed passenger. When the VCC pool does not include a VCC that equals the voucher value associated with the selected hotel accommodation, the card controller 156 unlocks a VCC with the next-highest value relative to the voucher value, requests a value adjustment with the credit system 180, and assigns the unlocked VCC as the meal voucher for the delayed passenger. If the value of the unlocked VCC is not adjusted by the credit system 180, the VCC remains unlocked as a meal voucher at the unadjusted value.

When the VCC(s) are assigned as voucher, the voucher coordinator 152 generates code(s) to enable the delayed passenger to use the VCC(s) for the corresponding voucher(s). For example, the voucher coordinator 152 generates an alphanumeric code for a hotel voucher and/or a scannable code (e.g., a QR code) for a meal voucher. Additionally, the passenger coordinator 144 is configured to present an interface, such as an interface 1200 of FIG. 12, that includes the generated code(s) to enable the delayed passenger to use the corresponding voucher(s). In FIG. 12, the interface 1200 includes an alphanumeric code 1210 for a hotel voucher, information related to the reserved hotel accommodation, and a scannable code 1220 for a meal voucher. In some examples, the passenger coordinator 144 presents the interface 1200 in response to the delayed passenger again selecting the unique link that initially presented the voucher offer. In other examples, the passenger coordinator 144 presents the interface 1200 in response to the delayed passenger selecting a different, unique link of another corresponding message sent via the notification controller 154.

In order to use a voucher, the passenger is to present a corresponding code of the voucher. For example, in order to use a meal voucher, the passenger presents the scannable code 1220 via the mobile device 170 for scanning. When the scannable code 1220 is scanned, a transaction is charged to the corresponding VCC. In order to use a hotel voucher, the passenger presents the alphanumeric code 1210 via the mobile device 170 upon arriving at the corresponding hotel. The hotel coordinator 146 presents a hotel-facing interface, such as an interface 1300 of FIG. 13, via the hotel computer 190 to enable a hotel receptionist to enter the alphanumeric code 1210 associated with the room reserved via the hotel voucher. In the illustrated example of FIG. 13, the interface 1300 includes an input field 1310 for check-in code. When the hotel coordinator 146 receives the alphanumeric code 1210 via the input field 1310 of the interface 1300, the voucher coordinator 152 validates that the received code corresponds with a hotel voucher. Upon validating the check-in code, the voucher coordinator 152 unlocks the corresponding VCC for use as a hotel voucher. That is, upon selection of a hotel room by the delayed passenger, the hotel coordinator 146 distribute the corresponding VCC to the hotel, temporarily obfuscates the VCC from the hotel, and subsequently unlocks the VCC for use upon receiving the corresponding check-in code from the hotel through the hotel-facing interface. Additionally, the hotel coordinator 146 causes the hotel-facing application to present corresponding check-in information (e.g., a VCC number, an expiry date, a security code) to the hotel receptionist. The voucher coordinator 152 and the hotel coordinator 146 enable payment to be processed immediately via the entering of the check-in code without the hotel having to subsequently submit a corresponding invoice.

In some examples, the voucher coordinator 152 is capable of canceling a hotel voucher as long as the voucher has yet to be unlocked. Upon canceling a hotel voucher, the voucher coordinator 152 releases the hotel room associated with the hotel voucher. If the voucher coordinator 152 had identified the hotel room from the internal hotel pool, the voucher coordinator 152 places the hotel room back into the internal hotel pool for subsequent re-utilization.

Further, in some examples, the voucher coordinator 152 unlocks the VCC and its information for access for a limited period of time (e.g., 7 days). The predefined limited period of time enables third parties (e.g., the hotel) to complete the billing process in a timely manner. Additionally, in some examples, the agent coordinator 142 causes the agent-facing interface to be updated in real-time when a VCC voucher is unlocked to enable the airline agent to track the status of the voucher.

Additionally, in some examples, after the hotel posts a transaction to the VCC voucher, the transaction is communicated to the voucher coordinator 152 within a short period of time (e.g., 48 hours). For example, the voucher coordinator 152 received the posted transaction via an XML batch file. Subsequently, the voucher coordinator 152 utilizes the batch file for a quick and paperless auto-reconciliation of hotel fees with the airline by comparing the amount charged by the VCC to the amount authorized for the hotel voucher.

Figure 2:
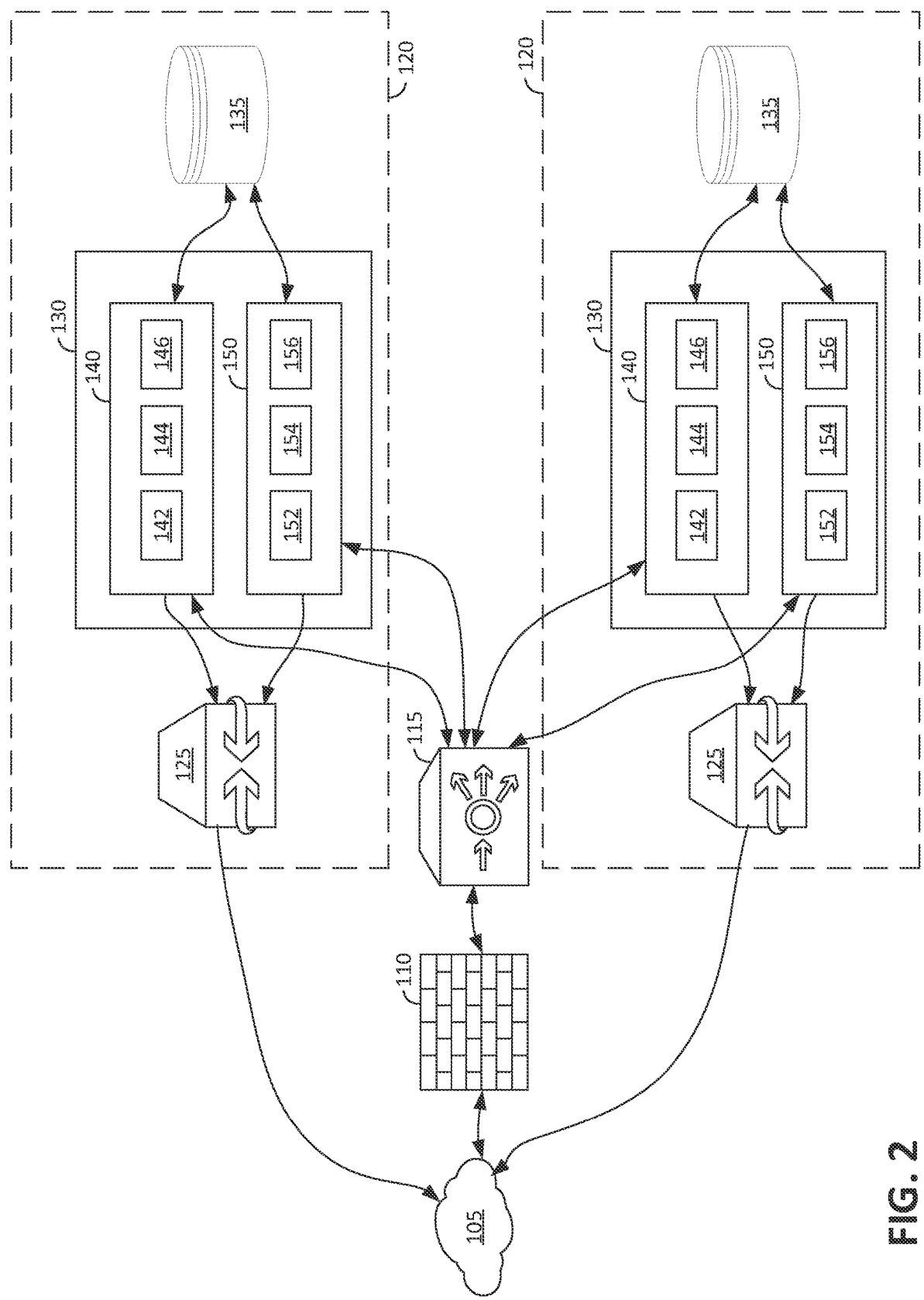
FIG. 2 depicts an example system for managing virtual credit cards designated for airline passenger vouchers within the environment of FIG. 1 in accordance with the teachings herein.

FIG. 2 depicts an example system for managing virtual credit cards designated for airline passenger vouchers in accordance with the teachings herein. In the illustrated example, the system is a cloud computing system that includes two or more redundant systems 120. In some examples, each of the systems 120 corresponds with a respective availability zone. Each availability zone includes a set of hardware that is in an isolated location within a data center region with respect to the other of the redundant availability zones.

As illustrated in FIG. 2, each of the systems 120 includes a network address translation (NAT) gateway 125, the server(s) 130, and one or more database(s) 135. The server(s) 130 are in communication with an application load balancer 115. Additionally, a firewall 110 is upstream the application load balancer 115 and downstream an internet gateway 105.

The internet gateway 105 facilitates communication between web applications operating on the cloud computing system (e.g., the agent-facing web application, the passenger-facing web application, the hotel-facing web application) and devices connected the internet (e.g., the agent computer 160, the mobile device 170, the hotel computer 190) to use those web applications. The firewall 110 is a web application firewall (WAF), such as Amazon Web Services® WAF, that protects the systems 120 operating the web applications against attacks (e.g., distributed denial-of-service (DDoS) attacks). Additionally, the application load balancer 115 that routes incoming user traffic to one or more of the systems 120 in a manner that balances the processing loads of the systems 120 at any given time.

As illustrated in FIG. 2, the server(s) 130 of each of the systems 120 includes a web application server 140 and an API server 150. The web application server 140 is configured to operate web applications of the system. For example, the web application server 140 includes the agent coordinator 142 to operate the agent-facing web application, the passenger coordinator 144 to operate the passenger-facing web application, and the hotel coordinator 146 to operate the hotel-facing web application. Additionally, the API server 150 is configured to operate APIs of the system. For example, the API server 150 includes the voucher coordinator 152 to operate the voucher API, the notification controller 154 to operate the notification API, and the card controller 156 to operate the VCC API.

The server(s) 130, including each of the web application server 140 and the API server 150, are structured to execute one or more sets of instructions, such as the voucher API, the agent-facing web application, the notification API, the passenger-facing web application, the VCC API, and the hotel-facing web application The server(s) 130 may be any suitable processing device(s) or set(s) of processing devices such as, but not limited to, a microprocessor, a microcontroller-based platform, an integrated circuit, one or more field programmable gate arrays (FPGAs), and/or one or more application-specific integrated circuits (ASICs).

Memory is configured to store the software for operating the systems and methods of the present disclosure. The memory may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory includes multiple kinds of memory, particularly volatile memory and non-volatile memory. The memory is computer readable media on which one or more sets of instructions, such as the software for operating the methods of the present disclosure, can be embedded. The instructions may embody one or more of the methods or logic as described herein. For example, the instructions reside completely, or at least partially, within the memory, the computer readable medium, and/or within the processor(s) and/or server(s) during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The memory also is configured to include the database(s) 135. The database(s) 135 are configured to store available VCCs and corresponding information within the pool of VCCs. For example, the database(s) 135 are configured to store available VCCs in a manner that is compatible with multiple different currencies to enable the VCCs to be distributed as vouchers in different regions. Further, the database(s) are configured to store information related to available hotels within the internal pool of hotels. In some examples, the database(s) 135 also are configured to store contact information of passengers. Additionally, the database(s) 135 are configured to store other information, such as predetermined time(s) to check a limit value of an unlocked VCC, predefined time(s) 135) to restock the pool of VCCs, target and/or threshold quantities of VCCs within the pool of VCCs, etc.

As illustrated in FIG. 2, the firewall 110 protects communication between the internet gateway 105 and application load balancer 115. The internet gateway 105 also receives information from the NAT gateway 125 of each of the systems 120. The application load balancer 115 also is in communication with the web application server 140 and the API server 150 of each of the systems 120. Within each of the systems 120, each of the web application server 140 and the API server 150 is in communication with the database(s) 135 and the NAT gateway 125. For example, the server(s) 130 are in communication with the database(s) 135 to retrieve information related for the VCC pool and the internal hotel pool. Further, in some examples, the server(s) 130 of one of the systems 120 is in communication with the database(s) 135 of another of the systems 120 for redundancy purposes.

FIGS. 3-8 are flowcharts of an example method 300 to operate a virtual credit card pool for airline passenger vouchers. The flowcharts of FIGS. 3-8 are representative of machine readable instructions that are stored in memory and include one or more programs which, when executed by processor(s) (such as the server(s) 130 of FIGS. 1-2), implement the example agent coordinator 142, the example passenger coordinator 144, the example hotel coordinator 146, the example voucher coordinator 152, the example notification controller 154, and the example card controller 156 of FIGS. 1-2. While the example program is described with reference to the flowchart illustrated in FIG. 3, many other methods of implementing the agent coordinator 142, the passenger coordinator 144, the hotel coordinator 146, the voucher coordinator 152, the notification controller 154, and/or the card controller 156 may alternatively be used. For example, the order of execution of the blocks may be rearranged, changed, eliminated, and/or combined to perform the method 300. Further, because the method 300 is disclosed in connection with the components of FIGS. 1-2, some functions of those components will not be described in detail below.

Initially, at block 305, the server(s) 130 determine whether a list of passenger name records (PNRs) of a delayed flight has been received. Each of the PNRs included in the list of PNRs corresponds with passengers who have qualified for a voucher (e.g., a hotel voucher, a meal voucher, etc.). In some examples, the server(s) 130 operate an agent-facing app that determines which of the passengers of a delayed flight qualify for a voucher based on the time of day, the length of delay, preferred-customer status, and/or other passenger characteristics. In other examples, the server(s) 130 receive the list of qualified passengers from a third-party application. In response to the server(s) 130 not receiving a list of PNRs of a delayed flight, the method 300 proceeds to block 800. Otherwise, in response to the server(s) 130 receiving a list of PNRs of a delayed flight, the method 300 proceeds to block 310 at which the server(s) 130 select a PNR from the list of qualified PNRs.

At block 315, the server(s) 130 determine whether the passenger(s) corresponding with the selected PNR qualifies for a hotel voucher. For example, passenger(s) are identified as qualifying for a hotel voucher based on the time of day, the length of delay, preferred-customer status, and/or other passenger characteristics. In response to the server(s) 130 determining that the passenger(s) corresponding with the selected PNR qualify for a hotel voucher, the method 300 proceeds to block 400 at which the server(s) process a hotel voucher for the selected PNR. A sub-process for processing the hotel voucher for the selected PNR is disclosed below in further detail with respect to FIG. 4. Upon completing block 400, the method 300 proceeds to block 320. Returning to block 315 of FIG. 3, in response to the server(s) 130 determining that the passenger(s) does not correspond with the selected PNR qualify for a hotel voucher, the method proceeds to block 320.

At block 320, the server(s) 130 determine whether the passenger(s) corresponding with the selected PNR qualifies for a meal and/or other voucher. For example, passenger(s) are identified as qualifying for a meal voucher based on the time of day, the length of delay, preferred-customer status, and/or other passenger characteristics. In response to the server(s) 130 determining that the passenger(s) corresponding with the selected PNR qualify for a meal and/or other voucher, the method 300 proceeds to block 500 at which the server(s) process a meal and/or other voucher for the selected PNR. A sub-process for processing the meal and/or other voucher for the selected PNR is disclosed below in further detail with respect to FIG. 5. Upon completing block 500, the method 300 proceeds to block 325. Returning to block 320 of FIG. 3, in response to the server(s) 130 determining that the passenger(s) does not correspond with the selected PNR qualify for a meal and/or other voucher, the method proceeds to block 325.

At block 325, the server(s) 130 determine whether there is another PNR in the list of qualifier PNRs. In response to the server(s) 130 determining that there is another PNR, the method 300 returns to block 310. Otherwise, in response to the server(s) 130 determining that there is no other PNR in the list of qualified PNRs, the method 300 proceeds to block 800.

At block 800, the server(s) 130 maintain a pool of virtual credit cards (VCC). A sub-process for maintaining the VCC pool is disclosed below in further detail with respect to FIG. 8. Upon completing block 800, the method proceeds to block 330 at which the server(s) 130 determine whether the current date-and-time corresponds with a predetermined time (e.g., stored in the database(s) 135) to batch transactions charged with the issued vouchers. In response to the server(s) 130 determining that the current date-and-time does not correspond with a time to batch transactions together, the method 300 proceeds to block 305. Otherwise, in response to the server(s) 130 determining that the current date-and-time corresponds with a time to batch transactions together, the method 300 proceeds to block 335 at which the server(s) 130 batch the transactions of the vouchers together for corresponding airlines, travel agents, and/or other travel organizations who are responsible for payment of the vouchers. Additionally, the server(s) 130 send the batched transactions to the corresponding airlines, travel agents, and/or other travel organizations for subsequent processing. For example, for each travel organization associated with a VCC voucher, the server(s) generate and transmit the report that includes each reconciled transaction of each virtual credit card unlocked for one or more qualified passengers of the travel organization.

Figure 3:
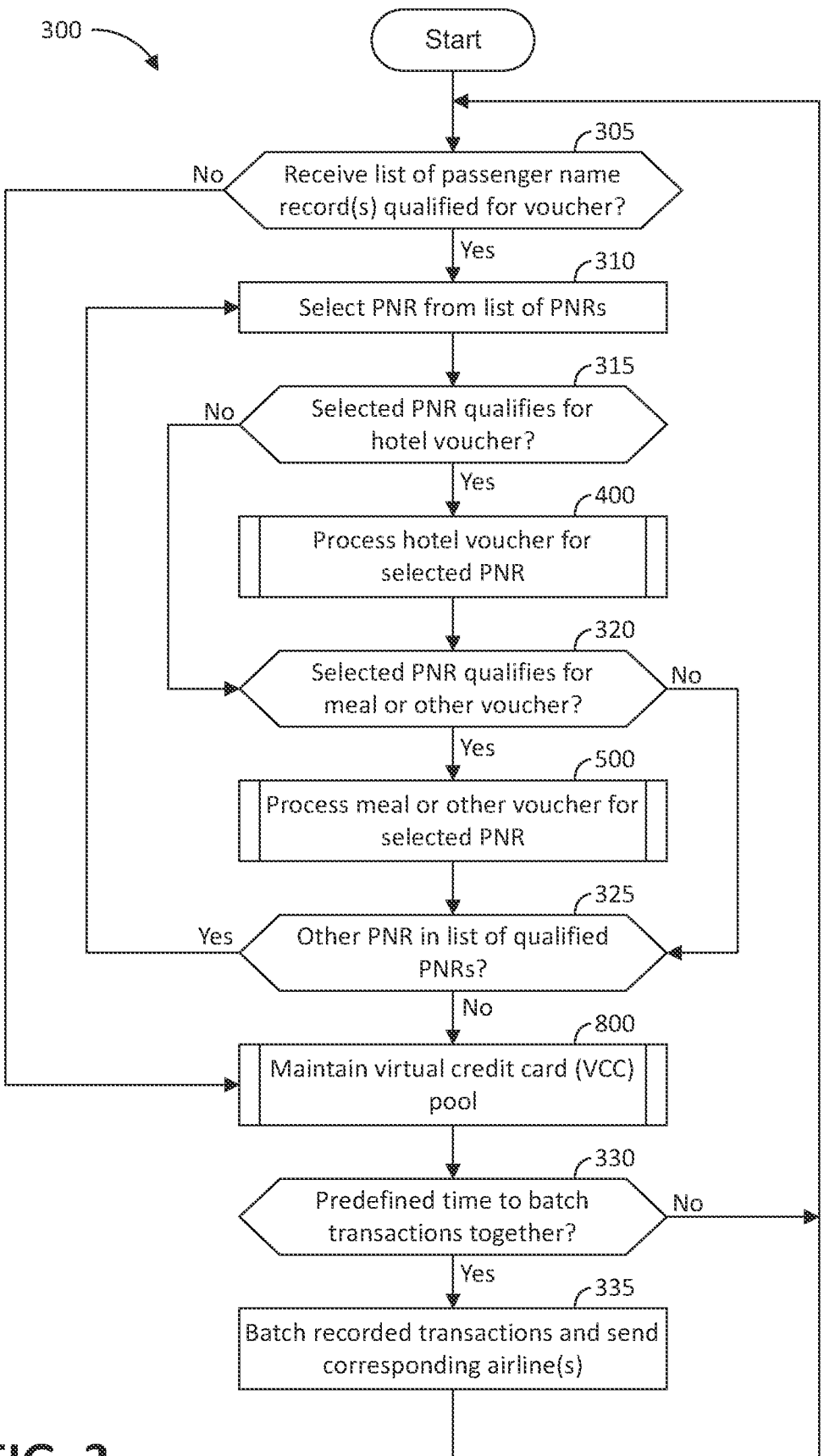
FIG. 3 is an example flowchart for managing virtual credit cards designated for airline passenger vouchers in accordance with the teachings herein.
Figure 4:
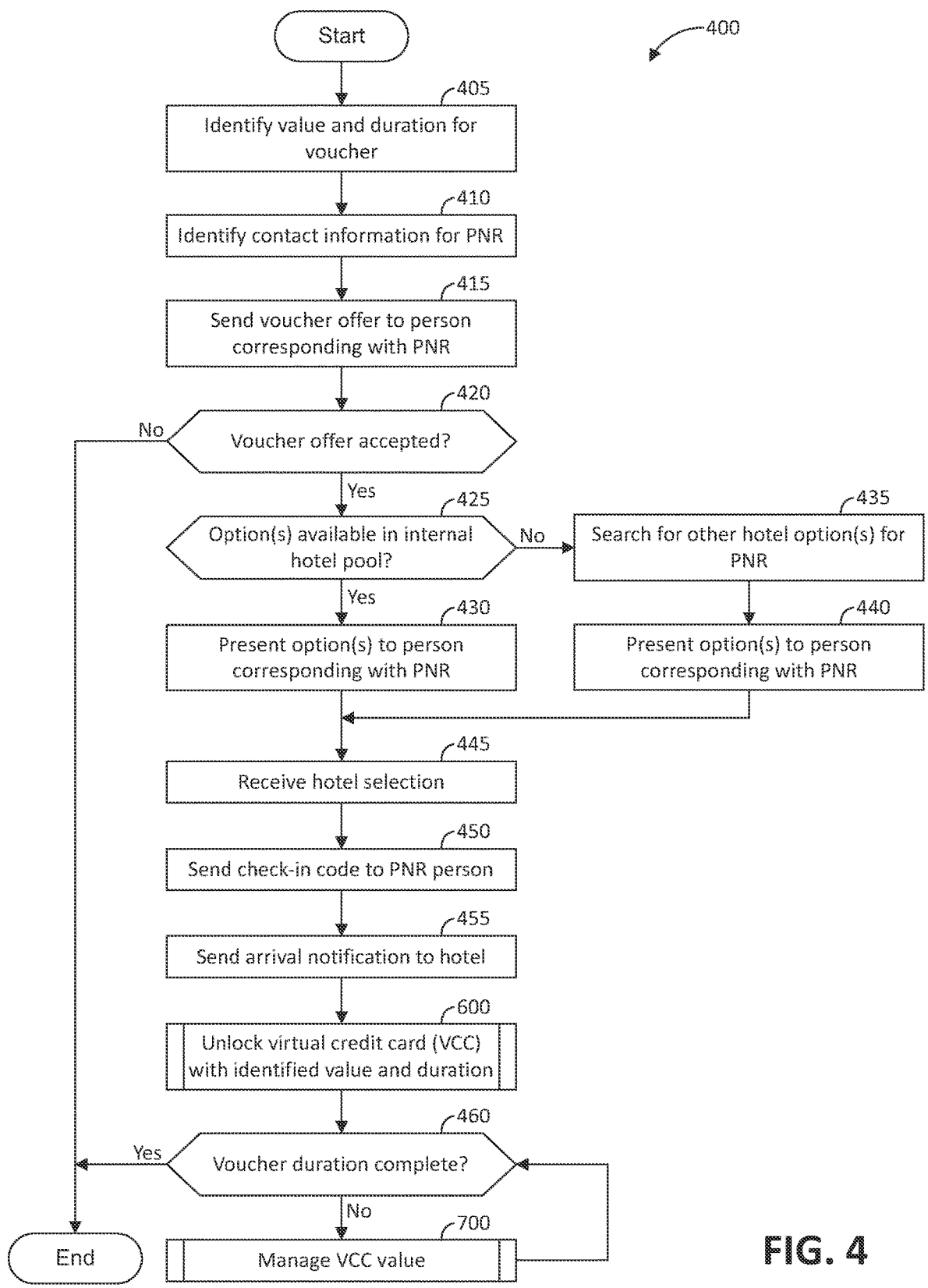
FIG. 4 is an example flowchart for processing hotel vouchers.

FIG. 4 is a flowchart of an example method 400 to perform the block 400 of FIG. 3 for processing a hotel voucher of a selected, qualified PNR. Initially, at block 405, the server(s) 130 identify a value and a duration for the hotel voucher. For example, the server(s) 130 identify a monetary limit and/or a designated number of night(s) for the voucher. At block 410, the server(s) 130 identify contact information for one or more of the passenger(s) associated with the selected PNR. For example, the server(s) 130 obtain the contact information from the airline when receiving the list of qualified PNRs. In other examples, the database(s) 135 contain the contact information associated with the PNRs and the server(s) 130 retrieve the corresponding contact information upon identifying the list of qualified PNRs. At block 415, the server(s) 130 utilize the contact information to send a voucher offer to the passenger(s) associated with the selected PNR via one or more messaging services. For example, the server(s) 130 sends a text message via a text service such as Twilio® and/or an email via an email service such as Amazon® Simple Email Service (SES).

At block 420, the server(s) 130 determine whether the offered voucher has been accepted by the passenger. For example, the server(s) 130 determines that the passenger has accepted the offered voucher upon receiving a corresponding offer acceptance signal via a passenger-facing web application that is operated by the server(s) 130. In response to the server(s) 130 determining that the passenger has declined the offered voucher, the method 400 ends for the selected PNR. Otherwise, in response to the server(s) 130 determining that the passenger has accepted the offered voucher, the method 400 proceeds to block 425.

At block 425, the server(s) 130 determine whether there are hotel vacancies available for the hotel voucher within an internal hotel pool (e.g., stored within the database(s) 135). For example, the server(s) 130 identifies available rooms based on the monetary limit and/or designated number of night(s) of the hotel voucher. In response to the server(s) 130 determining that there are hotel room(s) available for the hotel voucher within the internal hotel pool, the method 400 proceeds to block 430 at which the server(s) 130 present the available hotel room(s) to the passenger via a passenger-facing web application. For example, the server(s) 130 present the available hotel room(s) to the passenger via the passenger-facing web application in response to the passenger accepting the voucher offer via the passenger-facing web application. Otherwise, in response to the server(s) 130 determining that no hotel room is available for the hotel voucher within the internal hotel pool, the method 400 proceeds to block 435 at which the server(s) 130 search for other hotel accommodations for the passenger of the selected PNR. In some examples, the server(s) 130 scrape one or more travel website(s) for nearby hotel room(s) that are available within the monetary and duration limits of the hotel voucher. Upon completion, the method 400 proceeds to block 440 at which the server(s) 130 present the available hotel room(s) to the passenger via the passenger-facing web application.

Upon completion of block 430 or block 440, the method proceeds to block 445 at which the server(s) 130 receive a hotel selection from the passenger via the passenger-facing web application. At block 450, the server(s) 130 send a check-in code to the passenger corresponding to the selected PNR via a messaging service (e.g., text and/or email) and/or the passenger-facing web application. At block 455, the server(s) 130 sends an arrival notification to the hotel selected by the passenger via a messaging service (e.g., an email) and/or a hotel-facing web application to inform the hotel that the passenger is expected to arrive shortly. At block 600, the server(s) 130 unlock a virtual credit card (VCC) for the duration and amount identified for the hotel voucher. A sub-process for unlocking a VCC for the hotel voucher is disclosed below in further detail with respect to FIG. 6. Upon completing block 600, the method proceeds to block 460.

At block 460, the server(s) 130 determine whether the duration of the unlocked VCC hotel voucher has completed. In response to the server(s) 130 determining that the duration of the hotel voucher has completed, the method 400 ends for the selected PNR. Otherwise, in response to the server(s) 130 determining that the duration of the hotel voucher has not completed, the method 400 proceeds to block 700 at which the server(s) manage the value of the VCC hotel voucher. A sub-process for managing the value of the VCC hotel voucher is disclosed below in further detail with respect to FIG. 7. Upon completing block 700, the method returns to block 460.

Figure 5:
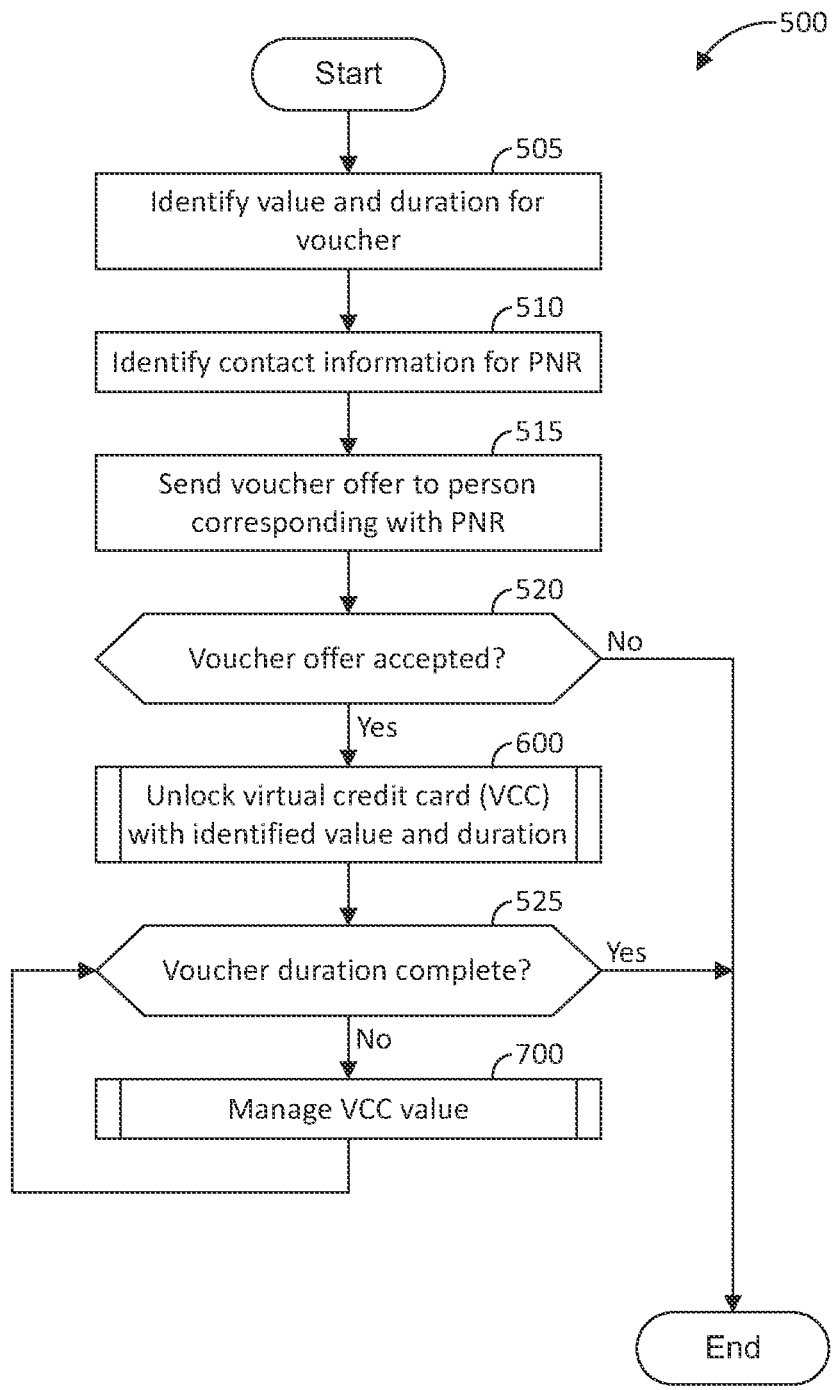
FIG. 5 is an example flowchart for processing meal and other vouchers.

FIG. 5 is a flowchart of an example method 500 to perform the block 500 of FIG. 3 for processing a meal and/or other voucher of a selected, qualified PNR. Initially, at block 505, the server(s) 130 identify a value and a duration for the hotel voucher. For example, the server(s) 130 identify a monetary limit for the voucher based on the number of passenger(s) associated with the PNR, the age of those passenger(s), etc. At block 510, the server(s) 130 identify contact information for one or more of the passenger(s) associated with the selected PNR. For example, the server(s) 130 obtain the contact information from the airline when receiving the list of qualified PNRs. In other examples, the database(s) 135 contain the contact information associated with the PNRs and the server(s) 130 retrieve the corresponding contact information upon identifying the list of qualified PNRs. At block 515, the server(s) 130 utilize the contact information to send a voucher offer to the passenger(s) associated with the selected PNR via one or more messaging services. For example, the server(s) 130 sends a text message via a text service such as Twilio® and/or an email via an email service such as Amazon® Simple Email Service (SES).

At block 520, the server(s) 130 determine whether the offered voucher has been accepted by the passenger. For example, the server(s) 130 determines that the passenger has accepted the offered voucher upon receiving a corresponding offer acceptance signal via the passenger-facing web application. In response to the server(s) 130 determining that the passenger has declined the offered voucher, the method 500 ends for the selected PNR. Otherwise, in response to the server(s) 130 determining that the passenger has accepted the offered voucher, the method 500 proceeds to block 600.

At block 600, the server(s) 130 unlock a virtual credit card (VCC) for the duration and amount identified for the hotel voucher. The sub-process for unlocking a VCC for the meal and/or other voucher is disclosed below in further detail with respect to FIG. 6. Upon completing block 600, the method proceeds to block 525 at which the server(s) 130 determine whether the duration of the unlocked VCC voucher has completed. In response to the server(s) 130 determining that the duration of the hotel voucher has completed, the method 500 ends for the selected PNR. Otherwise, in response to the server(s) 130 determining that the duration of the hotel voucher has not completed, the method 500 proceeds to block 700 at which the server(s) manage the value of the VCC hotel voucher. The sub-process for managing the value of the VCC hotel voucher is disclosed below in further detail with respect to FIG. 7. Upon completing block 700, the method returns to block 525.

In the illustrated example of FIG. 3, the block 500 is performed in series with block 400. In other examples, the block 500 is performed concurrently with and/or otherwise parallel to block 400. For example, if the selected PNR qualifies for both a hotel voucher and a meal and/or other voucher, the server(s) 130 send a single notification to the corresponding passenger for both the hotel voucher and the meal and/or other voucher. In some such examples, the server(s) 130 assign a single VCC to the delayed passenger for both the hotel voucher and the meal and/or other voucher. In other such examples, the server(s) 130 assign a first VCC to the delayed passenger for the hotel voucher and a second VCC to the delayed passenger for the meal and/or other voucher.

Figure 6:
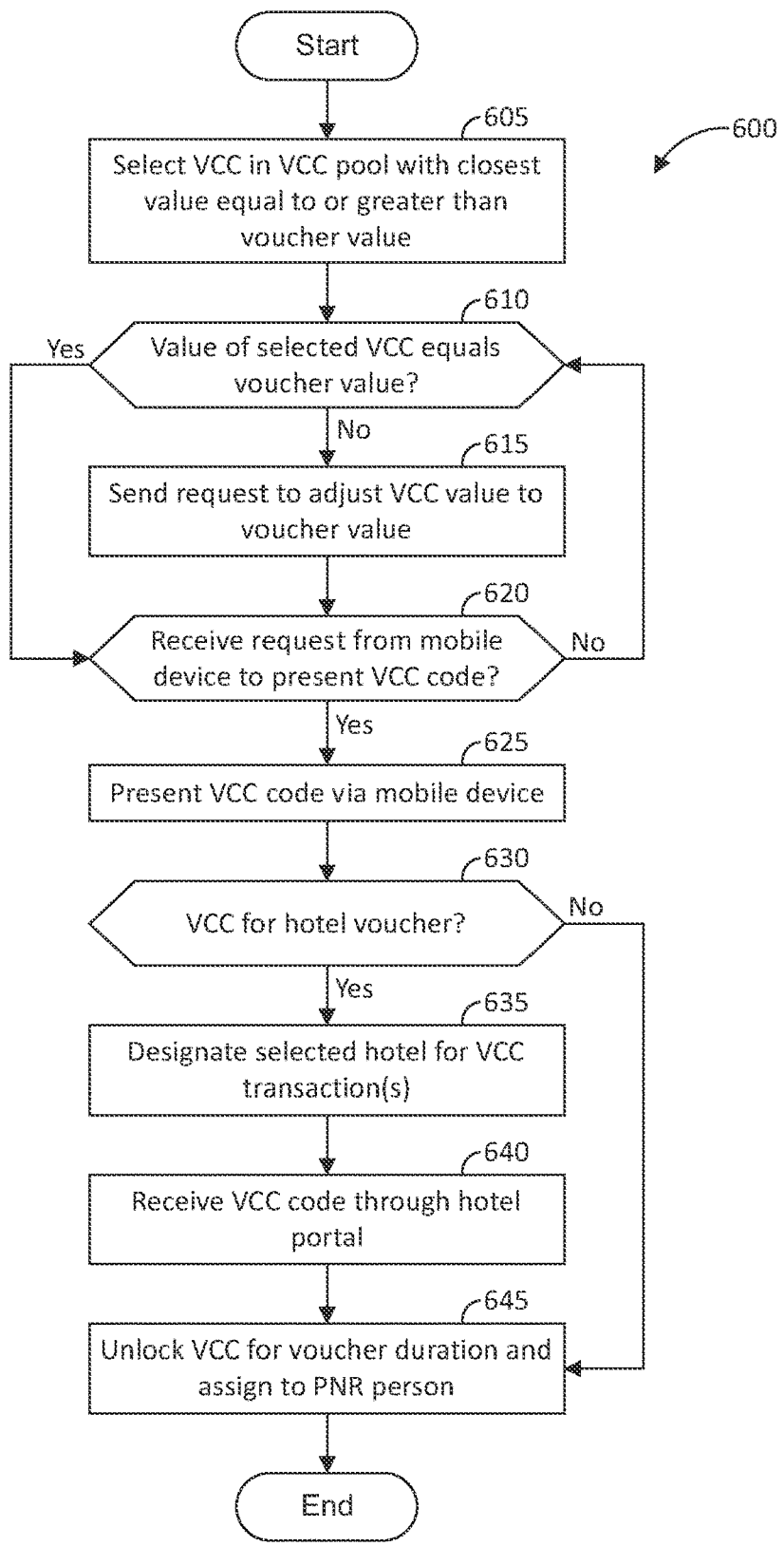
FIG. 6 is an example flowchart for issuing virtual credit cards for airline passenger vouchers.

FIG. 6 is a flowchart of an example method 600 to perform the block 600 of FIGS. 4 and 5 for unlocking a VCC as a voucher. Initially, at block 605, the server(s) 130 select a VCC within the VCC pool with the closest value that is equal to or greater than the voucher value. That is, in response to determining that the VCC pool includes a VCC having a card value that equals the voucher value, the server(s) 130 select one of the VCCs having the voucher value for unlocking. In response to determining that the VCC pool does not include a VCC having a card value that equals the voucher value, the server(s) 130 select one of the VCCs having the next-greater value relative to the voucher value. For example, if the server(s) 130 determine the voucher value to be 15 dollars and the VCC pool includes VCC with values of 5 dollars, 10 dollars, and 20 dollars, the server(s) 130 select one of the VCCs having a value of 20 dollars as having the closest value that is equal to or greater than the voucher value.

At block 610, the server(s) 130 determine whether the value of the selected VCC equals the voucher value. In response to the server(s) 130 determining that the VCC limit value equals the voucher value, the method 600 proceeds to block 620. Otherwise, in response to the server(s) 130 determining that the VCC limit value does not equal the voucher value, the method 600 proceeds to block 615 at which the server(s) 130 transmit a request to an external server of a credit card company (e.g., a virtual credit card company) to adjust the limit of the selected VCC to the voucher value. Upon completing block 615, the method 600 proceeds to block 620.

At block 620, the server(s) 130 determine whether a request to present a code (e.g., an alphanumeric code, a QR code) designated for the VCC voucher has been received. For example, the passenger-facing web application enables the passenger associated with the selected PNR to request presentation of the VCC code via the mobile device 170 of the passenger. In response to the server(s) 130 not receiving such a request, the method 600 returns to block 610. Otherwise, in response to the server(s) 130 determining that such a request has been received, the method 600 proceeds to block 625 at which the server(s) 130 present the VCC code on a display of the mobile device 170 via the passenger-facing web application.

At block 630, the server(s) 130 determine whether the selected VCC is for a hotel voucher. In response to the server(s) 130 determining that the selected VCC is not for a hotel voucher (e.g., the VCC is for a meal voucher), the method 600 proceeds to block 645. Otherwise, in response to the server(s) 130 determining that the selected VCC is for a hotel voucher, the method 600 proceeds to block 635 at which the server(s) designates the hotel selected by the passenger for transactions of the selected VCC. In other words, the server(s) 130 limit any transaction of the selected VCC to those initiated by the selected hotel. At block 640, the server(s) 130 receive the code of the VCC hotel voucher through a portal of the hotel-facing web application. For example, the server(s) 130 receive the VCC code through the portal upon (1) the passenger arriving at the selected hotel, (2) the passenger presenting the VCC code to a hotel receptionist via the mobile device 170 (at block 625), and (3) the hotel receptionist entering the VCC code into the hotel portal. Upon completion of block 640, the method 600 proceeds to block 645.

At block 645, the server(s) 130 unlock the selected VCC for use as a voucher and remove the unlocked VCC from the VCC pool. For example, when unlocking the selected VCC as a voucher, the server(s) 130 unlock the selected VCC to be operable for only the voucher duration. Further, the server(s) 130 assign the unlocked VCC to the passenger associated with the selected PNR such that any subsequent transaction(s) of the unlocked VCC are associated with the voucher for the selected PNR.

Figure 7:
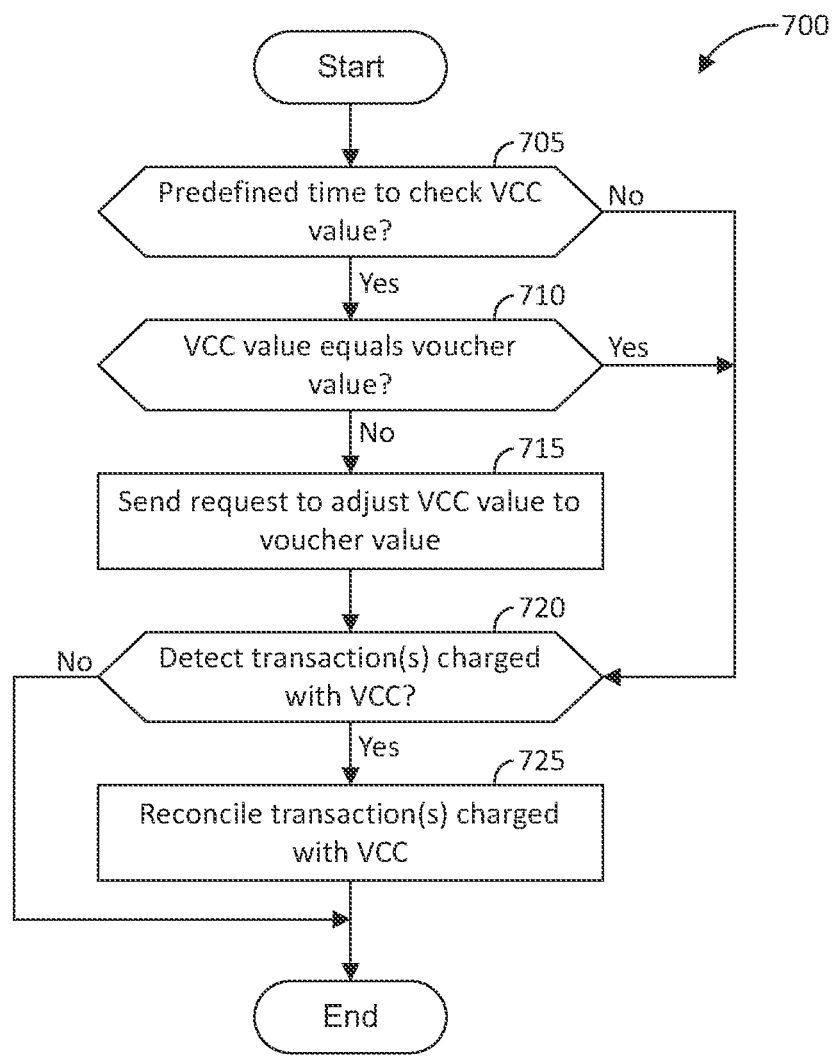
FIG. 7 is an example flowchart for managing the value of virtual credit cards designated for airline passenger vouchers.

FIG. 7 is a flowchart of an example method 700 to perform the block 700 of FIGS. 4 and 5 for managing the value of the VCC voucher. Initially, at block 705, the server(s) 130 determine whether the current date-and-time corresponds with a predetermined time (e.g., stored in the database(s) 135) to check the VCC limit value. For example, the server(s) 130 may be configured to check the VCC limit value at a predefined interval (e.g., once every minute, once every 15 minutes, once every hour, etc.). In response to the server(s) 130 determining that the current date-and-time does not correspond with a predefined time to check the VCC limit value, the method 700 proceeds to block 720. Otherwise, in response to the server(s) 130 determining that the current date-and-time corresponds with a predefined time to check the VCC limit value, the method 700 proceeds to block 710.

At block 710, the server(s) 130 determine whether the VCC limit value equals the voucher value (e.g., as adjusted in response to the corresponding request of block 615 of FIG. 6). In response to the server(s) 130 determining that the VCC limit value equals the voucher value, the method 700 proceeds to block 720. Otherwise, in response to the server(s) 130 determining that the VCC limit value does not equal the voucher value, the method 700 proceeds to block 715 at which the server(s) 130 transmit a request to the external server of the credit card company to adjust the limit of the selected VCC to the voucher value. That is, the server(s) 130 are configured to repeatedly transmit request(s) to adjust the limit of the selected VCC to the voucher value until the VCC limit value limit is adjusted by the external server or the voucher duration ends. Upon completing block 715, the method 700 proceeds to block 720.

At block 720, the server(s) 130 determine whether any transaction(s) have been charged with the VCC voucher. In response to the server(s) 130 determining that no transactions have been charged with the VCC voucher, the method 700 ends. Otherwise, in response to the server(s) 130 determining that transaction(s) have been charged with the VCC voucher, the method 700 proceeds to block 725 at which the server(s) 130 reconcile any transaction(s) charged with the VCC voucher with the corresponding PNR.

Figure 8:
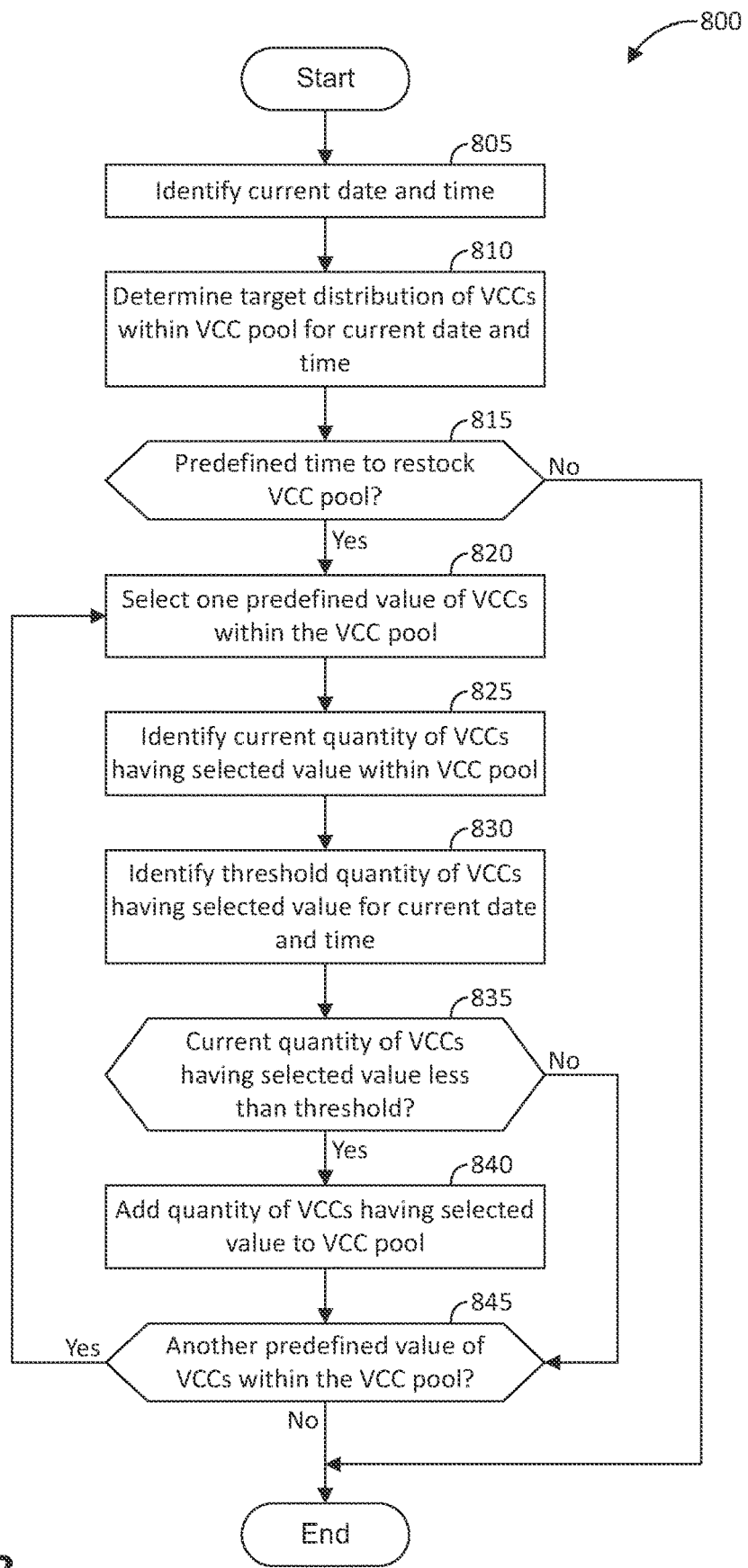
FIG. 8 is an example flowchart for operating a pool of virtual credit cards designated for issuance to airline passenger vouchers.

FIG. 8 is a flowchart of an example method 800 to perform the block 800 of FIG. 3 for maintaining a pool of VCCs in a manner that overcomes the batch processing limitations of credit-card computing systems to enable the reliable and real-time distribution of the VCCs as vouchers. Initially, at block 805, the server(s) 130 determine a current date-and-time. At block 810, the server(s) 130 determine a target distribution of the VCCs for the current date-and-time. For example, the target distribution for a date-and-time is determined (e.g., by the server(s) 130) based on historical voucher data and/or a credit limit associated with the VCC pool. The database(s) 135 store the target distribution for different dates-and-times, and the server(s) 130 retrieve the target distribution for a corresponding date-and-time from the database(s) 135 upon determining that the corresponding date-and-time is the current date-and-time.

A target distribution identifies a first targeted quantity of VCCs within the VCC pool for a first predefined VCC value, a second targeted quantity of VCCs for a second predefined VCC value, a third targeted quantity of VCCs for a third predefined VCC value, etc. In some examples, the server(s) 130 identify a first targeted quantity of VCCs (e.g., 250 VCCs) for a first predefined VCC value (e.g., 10 dollars) to be different than a second targeted quantity of VCCs (e.g., 200 VCCs) for a second predefined VCC value (e.g., 25 dollars). Further, in some examples, the server(s) 130 determine the target distribution of the VCC pool to be different at different date(s) and/or time(s)-of-day. For example, the target distribution at first date-and-time (e.g., Friday at 5:00 PM) is different than the target distribution at a second date-and-time (e.g., Wednesday at 10:00 AM). In some such examples, the target distribution at a first date-and-time has a targeted quantity (e.g., 250 VCCs) for a predefined VCC value (e.g., a 100 dollar value) that is different than the targeted quantity (e.g., 150 VCCs) for the predefined VCC value (e.g., a 100 dollar value) at a second date-and-time.

At block 815, the server(s) 130 determine whether the current date-and-time corresponds (e.g., matches) with a predefined time (e.g., stored in the database(s) 135) to restock the VCC pool with additional VCCs. In some examples, the server(s) 130 check whether to restock the VCC pool at a predefined interval (e.g., once every 15 minutes, once every hour, once every day, etc.). Additionally or alternatively, the server(s) 130 check whether to restock the VCC pool only at times when a card distributer (e.g., the external server of a credit card company) are known to issue new virtual credit cards. For example, the server(s) 130 may analyze historical data to identity regularly-occurring period(s) of time during which the external server of the card distributor consistently issues VCCs and selects the predefined check time(s) to occur within those regularly-occurring period(s) of time. In response to the server(s) 130 determining that the current date-and-time does not correspond with a predefined time for restocking the VCC pool, the method 800 ends. Otherwise, in response to the server(s) 130 determining that the current date-and-time corresponds with a predefined time for restocking the VCC pool, the method 800 proceeds to block 820.

At block 820, the server(s) 130 select one of the predefined VCC values within the VCC pool. At block 820, the server(s) 130 a current quantity of VCCs within the VCC pool that have the selected VCC value. At block 830, the server(s) 130 identify a threshold quantity of VCCs (e.g., stored in the database(s) 135) having the selected VCC value. In some examples, the threshold quantity equals the target quantity. In other examples, the threshold quantity is less than the target quantity.

At block 835, the server(s) 130 determine whether the current quantity of VCCs within the VCC pool is less than the corresponding threshold quantity. In response to the server(s) 130 determining that the current quantity is greater than or equal to the corresponding threshold quantity, the method 800 proceeds to block 845. Otherwise, in response to the server(s) 130 determining that the current quantity is less than the corresponding threshold quantity, the method 800 proceeds to block 840.

At block 840, the server(s) 130 add a quantity of VCCs having the selected predefined value to the VCC pool. For example, the server(s) 130 add VCCs having the selected predefined value to the VCC pool by (1) determining the quantity of the VCCs to be added to the VCC pool, (2) transmitting a request to the external server of the credit card company, (3) received the requested VCCs from the external server, and (4) include the received VCCs in the VCC pool stored in the database(s) 135. In some examples, the quantity of VCCs to be added is a predefined quantity stored in the database(s) 135. For example, every time the current quantity of VCCs is less than the corresponding threshold quantity, the same predefined number of VCCs is added to the VCC pool. In other examples, the quantity of VCCs to be added to the VCC pool is based on the current number of VCCs having the selected VCC value. For example, the quantity of VCCs to be added equals the difference between the target number of VCCs having the selected VCC value and the corresponding current number of VCCs. Upon completion of block 840, the method 800 proceeds to block 845.

At block 845, the server(s) 130 determine whether there is another predefined value of VCCs within the VCC pool. In response to the server(s) 130 determining that there is another predefined value of VCCs within the VCC pool, the method 800 returns to block 820. Otherwise, in response to the server(s) 130 determining that there is no other predefined value of VCCs within the VCC pool, the method 800 ends.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system for operating a virtual credit card pool for travel vouchers, comprising:
   one or more databases configured to store virtual credit cards within the virtual credit card pool;
   one or more servers configured to:
      receive a list of one or more qualifying persons that qualify for a voucher;
      identify contact information for the one or more qualifying persons;
      generate, for the one or more qualifying persons, an electronic voucher offer comprising one or more unique, time-sensitive web links that are configured to disable after a respective predefined period of time, wherein the one or more web links are configured to, prior to being disabled, enable acceptance of the electronic voucher offer having an associated voucher value;
      transmit the one or more generated electronic voucher offers to the respective one or more qualifying persons using the identified contact information;
      receive one or more voucher offer acceptances in response to one or more selections of one or more of the one or more web links in the one or more transmitted electronic voucher offers by the respective one or more qualifying persons;
      unlock one of the virtual credit cards stored within the virtual credit card pool for each of the received one or more voucher offer acceptances of the one or more qualifying persons, wherein, to unlock one of the virtual credit cards for a respective one of the one or more of the accepted voucher offers, the one or more servers is configured to:
         determine whether any of the virtual credit cards stored within the virtual credit card pool has a first card value that equals the associated voucher value of the respective one of the one or more accepted voucher offers;
         in response to determining that one or more of the virtual credit cards stored within the virtual credit card pool has the first card value that equals the associated voucher value, unlock a first virtual credit card having the first card value that equals the associated voucher value; and
         in response to determining that none of the virtual credit cards stored within the virtual credit card pool have the first card value that equals the associated voucher value, unlock a second virtual credit card having a second card value that is greater than the associated voucher value;
      remove each of the virtual credit cards that has been unlocked from the virtual credit card pool; and
      generate a respective code to be presented to a respective one of the one or more qualifying persons for each of the virtual credit cards that has been unlocked.

2. The system of claim 1, wherein the one or more servers is configured to enable each of the virtual credit cards that has been unlocked to be operable by a respective one of the one or more qualifying persons for a voucher duration.

3. The system of claim 1, wherein, when the second virtual credit card is unlocked, the one or more servers is configured to transmit a request to an external server of a card distributer to decrease the second card value of the second virtual credit card to the associated voucher value.

4. The system of claim 3, wherein the one or more servers is configured to intermittently transmit the request until the external server decreases the second card value or at an end of a voucher duration.

5. The system of claim 1, wherein one or more of the virtual credit cards that has been unlocked is designated as a hotel voucher or a meal voucher.

6. The system of claim 1, wherein, when the respective one of the one or more accepted voucher offers is designated as a hotel voucher, the one or more servers is configured to:
   receive a hotel selection from a respective one of the one or more qualifying persons;
   transmit a check-in code to the respective one of the one or more qualifying persons using their identified contact information;
   transmit an arrival notification to a hotel of the hotel selection via electronic communication; and
   in response to the check-in code being entered into a hotel-facing web portal, unlock one of the virtual credit cards stored within the virtual credit card pool for the respective one of the one or more qualifying persons.

7. The system of claim 1, wherein, when the respective one of the one or more accepted voucher offers is for a predefined voucher type, the one or more servers is configured to transmit the code designated for the respective one of the virtual credit cards that has been unlocked to a respective one of the one or more qualifying persons.

8. The system of claim 1, wherein the virtual credit cards stored within the virtual credit card pool are associated with a plurality of currencies and are configured to be distributed in a plurality of respective regions.

9. A method for operating a virtual credit card pool for travel vouchers, comprising:
   storing, in one or more databases, virtual credit cards within the virtual credit card pool;
   receiving, by one or more servers, a list of one or more qualifying persons that qualify for a voucher;

identifying contact information for at least one of the one or more qualifying persons;

generating, by the one or more servers and for each of the one or more qualifying persons, an electronic voucher offer comprising one or more unique, time-sensitive web links that are configured to disable after a respective predefined period of time, wherein the one or more web links are configured to, prior to being disabled, enable acceptance of the electronic voucher offer having an associated voucher value;

transmitting, la the one or more servers, the one or more generated electronic voucher offers to the respective one or more qualifying persons using the identified contact information;

receiving, by the one or more servers, one or more voucher offer acceptances in response to one or more selections of one or more of the one or more web links in the one or more transmitted electronic voucher offers by the respective one or more qualifying persons;

unlocking, la the one or more servers, one of the virtual credit cards stored within the virtual credit card pool for each of the received one or more voucher offer acceptances of the one or more qualifying persons, wherein unlocking one of the virtual credit cards for a respective one of the one or more accepted voucher offers comprises:

determining whether any of the virtual credit cards stored within the virtual credit card pool has a first card value that equals the associated voucher value of the respective one of the one or more accepted voucher offers;

unlocking a first virtual credit card having the first card value that equals the associated voucher value in response to determining that one or more of the virtual credit cards stored within the virtual credit card pool has the first card value that equals the associated voucher value; and unlocking a second virtual credit card having a second card value that is greater than the associated voucher value in response to determining that none of the virtual credit cards stored within the virtual credit card pool have the first card value that equals the associated voucher value; and removing, la the one or more servers, each of the virtual credit cards that has been unlocked from the virtual credit card pool for distribution to a respective one of the one or more qualifying persons.

10. The method of claim 9, wherein unlocking one of the virtual credit cards includes enabling the one of the virtual credit cards to be operable by a respective one of the one or more qualifying persons for a voucher duration.

11. The method of claim 9, further comprising, upon unlocking the second virtual credit card, transmitting, via the one or more servers, a request to an external server of a card distributer to decrease the second card value of the second virtual credit card to the associated voucher value.

12. The method of claim 11, further comprising intermittently transmitting the request until the external server decreases the second card value or at an end of a voucher duration.

13. The method of claim 9, wherein each of the virtual credit cards that has been unlocked is designated for a hotel voucher or a meal voucher.

14. The method of claim 9, when the respective one of the one or more accepted voucher offers is designated as a hotel voucher, further comprising:

receiving, via the one or more servers, a hotel selection from a respective one of the one or more qualifying persons;

transmitting a check-in code to the respective one of the one or more qualifying persons using their identified contact information;

transmitting an arrival notification to a hotel of the hotel selection via electronic communication; and in response to the check-in code being entered into a hotel-facing web portal, unlocking one of the virtual credit cards stored within the virtual credit card pool for the respective one of the one or more qualifying persons.

15. The method of claim 9, further comprising, when the respective one of the one or more accepted voucher offers is for a predefined voucher type, transmitting a code designated for the respective one of the virtual credit cards that has been unlocked to a respective one of the one or more qualifying persons.

* * * * *